(12) United States Patent
Srinivasaraghavan et al.

(10) Patent No.: US 11,375,280 B2
(45) Date of Patent: *Jun. 28, 2022

(54) SYSTEMS AND METHODS FOR EVALUATING MODELS THAT GENERATE RECOMMENDATIONS

(71) Applicant: Verizon Patent and Licensing Inc., Basking Ridge, NJ (US)

(72) Inventors: Haripriya Srinivasaraghavan, Plano, TX (US); Rajeshwar Makam, Irving, TX (US); Frolov Volodymyr, Dallas, TX (US); Pratik Sarkar, Irving, TX (US); Ankit Naidu, Lewisville, TX (US); Yevhen Rutskyi, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,612

(22) Filed: Jul. 12, 2021

(65) Prior Publication Data
US 2022/0014822 A1    Jan. 13, 2022

Related U.S. Application Data

(63) Continuation of application No. 16/922,460, filed on Jul. 7, 2020, now Pat. No. 11,070,881.

(51) Int. Cl.
*H04N 21/25* (2011.01)
*H04N 21/466* (2011.01)
*H04N 21/84* (2011.01)

(52) U.S. Cl.
CPC ....... *H04N 21/4668* (2013.01); *H04N 21/251* (2013.01); *H04N 21/4662* (2013.01); *H04N 21/84* (2013.01)

(58) Field of Classification Search
None
See application file for complete search history.

(56) References Cited

U.S. PATENT DOCUMENTS

| | | | |
|---|---|---|---|
| 8,433,622 | B2 | 4/2013 | Gross |
| 9,336,483 | B1 | 5/2016 | Abeysooriya et al. |
| 10,394,408 | B1 | 8/2019 | Freund et al. |
| 10,762,422 | B2 | 9/2020 | Shaked et al. |
| 2003/0237087 | A1 | 12/2003 | Kurapati et al. |
| 2004/0243479 | A1 | 12/2004 | Gross |
| 2006/0123448 | A1 | 6/2006 | Ma et al. |
| 2008/0228689 | A1 | 9/2008 | Tewary et al. |

(Continued)

*Primary Examiner* — William J Kim

(57) ABSTRACT

A device may receive content data, a first model, and a second model. The first model may be trained on different types of metadata than the second model. The content data may include a first identifier of a first content item and a first set of metadata associated with the first content item. The device may process the first set of metadata to generate first recommendations from the first model and second recommendations from the second model. The device may provide the first identifier and a combination of the first recommendations and the second recommendations to client devices. The device may receive, from the client devices, user-generated target recommendations based on the combination. The device may process the user-generated target recommendations, the first recommendations, and the second recommendations, to provide feedback to update the first model and the second model.

20 Claims, 17 Drawing Sheets

(56) References Cited

U.S. PATENT DOCUMENTS

| | | |
|---|---|---|
| 2012/0151511 A1 | 6/2012 | Bernard et al. |
| 2012/0311633 A1 | 12/2012 | Mandrekar et al. |
| 2012/0331494 A1 | 12/2012 | Pontual et al. |
| 2014/0297394 A1 | 10/2014 | Li et al. |
| 2015/0012468 A1 | 1/2015 | Kegel et al. |
| 2017/0259121 A1 | 9/2017 | King et al. |
| 2018/0152763 A1 | 5/2018 | Barlaskar et al. |
| 2018/0213284 A1 | 7/2018 | Shekhar et al. |
| 2018/0336645 A1 | 11/2018 | Price |
| 2018/0357562 A1 | 12/2018 | Hofman |
| 2019/0082336 A1 | 3/2019 | Wahlstrom et al. |
| 2019/0164084 A1 | 5/2019 | Gulin |
| 2019/0197194 A1 | 6/2019 | Larusson et al. |
| 2019/0259293 A1 | 8/2019 | Hellman et al. |
| 2019/0327526 A1 | 10/2019 | Navin et al. |
| 2020/0005157 A1 | 1/2020 | Rosenstein et al. |
| 2020/0005196 A1 | 1/2020 | Cai et al. |
| 2020/0118010 A1 | 4/2020 | Lee et al. |
| 2020/0193288 A1 | 6/2020 | Li et al. |
| 2020/0273485 A1 | 8/2020 | Jagmag et al. |
| 2021/0011939 A1 | 1/2021 | Sardar et al. |
| 2021/0011958 A1 | 1/2021 | Cox et al. |

# SYSTEMS AND METHODS FOR EVALUATING MODELS THAT GENERATE RECOMMENDATIONS

RELATED APPLICATION

This application is a continuation of U.S. patent application Ser. No. 16/922,460, filed Jul. 7, 2020, and entitled "SYSTEMS AND METHODS FOR EVALUATING MODELS THAT GENERATE RECOMMENDATIONS" (now U.S. Pat. No. 11,070,881), which is incorporated herein by reference in its entirety.

BACKGROUND

A content delivery system may provide content to client devices of a plurality of users. Based on selection of a content item (e.g., a movie, a television show, a song, a game, a book, and/or the like), by a user of the plurality of users, the content delivery system may generate recommendations for the user.

DETAILED DESCRIPTION OF PREFERRED EMBODIMENTS

Figure 1A:
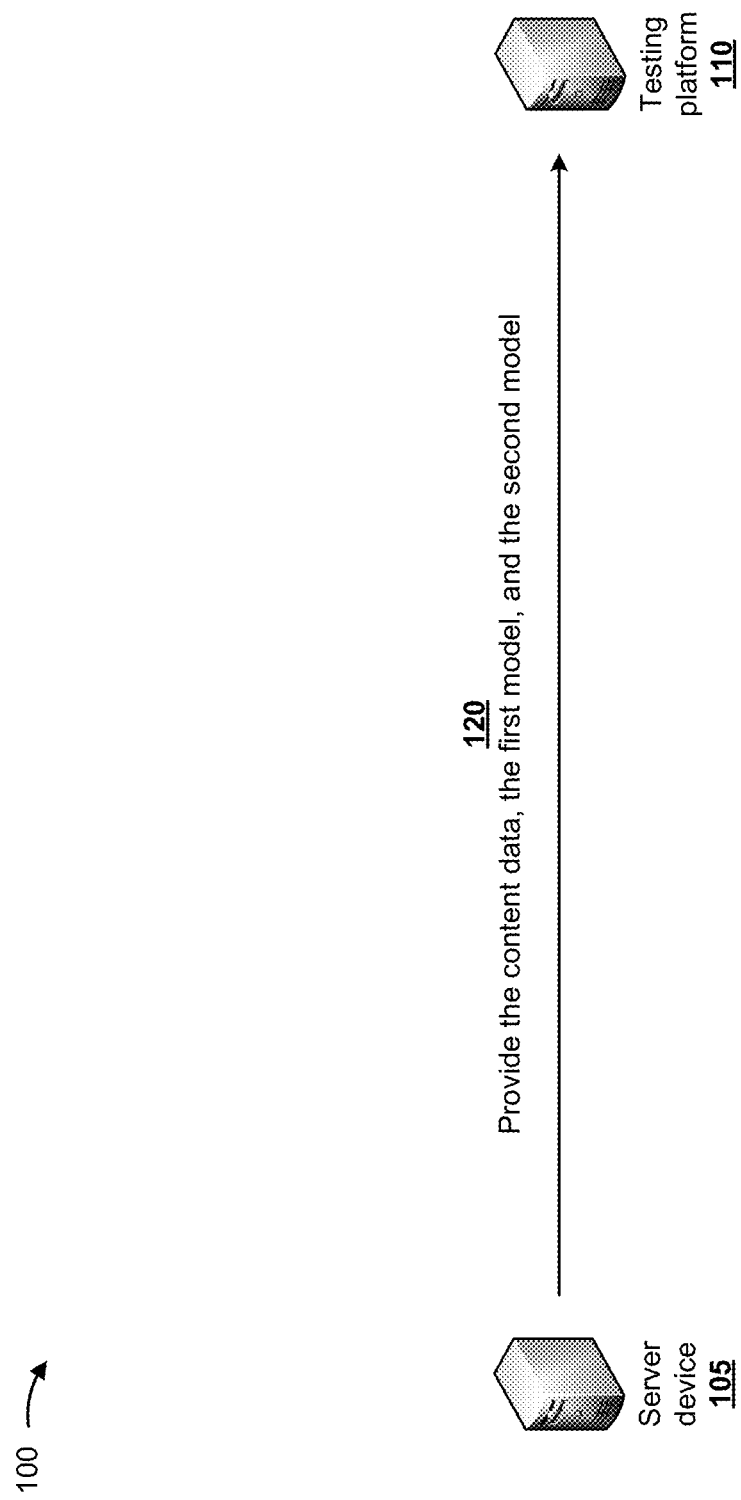
FIGS. 1A-1M are diagrams of one or more example implementations described herein.

The following detailed description of example implementations refers to the accompanying drawings. The same reference numbers in different drawings may identify the same or similar elements.

A content delivery system may provide content to client devices of a plurality of users. The content may include movies, television shows, songs, games, books, a combination thereof, and/or the like. Based on selection of a content item (e.g., a movie, a television show, a song, a game, a book, and/or the like) by a user of the plurality of users, the content delivery system may generate recommendations for the user. The content delivery system may generate the recommendations based on metadata associated with the content item. The metadata may identify, for example, a genre of the content item, one or more creators of the content item, a rating of the content item, a release year of the content item, and/or the like. Additionally, or alternatively, the content delivery system may generate the recommendations based on a selection history of the user, feedback from the user, a selection history of one or more other users, feedback from the one or more other users, and/or the like. The recommendations may be presented to the user as a list of content items related to the content item. The list of content items may be ranked in order of likelihood of interest to the user.

When recommendations align with personal preferences of the user, the recommendations may be more valuable to a provider of the content delivery system, to the content creators, and to the user. However, because the content delivery system may have thousands or millions of users, optimizing the recommendations may be a difficult task. The content delivery system may consume computing resources (e.g., processing resources, memory resources, communication resources, and/or the like) and/or network resources storing large amounts of data relating to content selection, analyzing the large amounts of data, and/or the like.

Some implementations described herein provide a device (e.g., a testing platform, and/or the like) that facilitates evaluation and improvement of models that generate recommendations. The device may receive content data, a first model for generating first recommendations, and a second model for generating second recommendations. The content data may include content identifiers of content items and sets of metadata associated with the content items. The second model may be trained on different types of metadata than the first model and/or trained using a different technique than the first model. The device may process, within one or more testing modes, the sets of metadata associated with the content items, to generate the first recommendations from the first model and the second recommendations from the second model. The one or more testing modes may permit the device to obtain different forms of user feedback regarding the first recommendations and the second recommendations. The device may provide the content identifiers of the content items along with the first recommendations and the second recommendations to client devices for the user feedback. The device may receive, from the client devices, the user feedback that indicates whether the first recommendations were more or less accurate than the second recommendations. Based on the user feedback, the device may perform one or more actions to update the first model and/or the second model.

By streamlining evaluation of the models, the device may ensure that the recommendations are optimized to align with preferences of the users. Furthermore, the device may conserve computing resources (e.g., processing resources, memory resources, communication resources, and/or the like) and/or network resources that might otherwise have been consumed storing large amounts of data relating to content selection, analyzing the large amounts of data, and/or the like.

FIGS. 1A-1M are diagrams of one or more example implementations 100 described herein. FIG. 1A illustrates an example of a server device 105 interacting with a testing platform 110 to configure the testing platform 110 for evaluating models that generate recommendations. FIGS. 1B-1L illustrate one or more examples of the testing platform 110 interacting with client devices 115 to evaluate and/or enable improvement of the models. FIG. 1M illustrates an example of the testing platform 110 interacting with the server device 105 to cause the server device 105 to implement a model within a system.

An online provider of goods and/or services (e.g., a content delivery system, a retailer, a rental service, a marketplace, a restaurant, and/or the like) may seek to utilize data to predict behavior of a user after the user initially engages with a website of the online provider (e.g., by accessing an item and/or a service, by purchasing the item and/or the service, by renting the item and/or the service, by moving the item and/or service to a shopping cart, and/or the like). Using the data, the online provider may train a plurality of models to generate recommendations that are similar to the item and/or the service. To determine which of the plurality of models is more accurate, the online provider may utilize the testing platform 110 to obtain feedback from users associated with client devices (e.g., the client devices 115). To obtain the feedback, the users associated with the client devices 115 may be invited to participate in a model evaluation process via email, upon registration with the website of the online provider, and/or the like.

To simplify the explanation, FIGS. 1A-1M will be described below in terms of a content delivery system that has two different models for generating recommendations of content items, such as movies, television shows, songs, games, books, products, a combination of the foregoing, and/or the like. It should be understood, however, that that the systems and methods described in connection with FIGS. 1A-1M are provided merely as examples. In practice, the systems and methods may be implemented for different types of providers (e.g., online and/or brick and mortar retailers, rental services, marketplaces, restaurants, and/or the like), may utilize different types of data to train the models, may have more than two models for generating recommendations, may generate different types of recommendations, and/or the like.

In FIG. 1A, assume that a first model generator of the content delivery system generated a first model to provide recommendations based on content items. The first model generator may have trained the first model based on one or more first types of metadata associated with the content items, selection history of the content items, user feedback data relating to the content items, and/or the like. The metadata associated with a content item may include information identifying a genre of the content item, a creator of the content item, a rating of the content item, a release year of the content item, and/or the like. These types of metadata are intended to be examples of types of metadata that might be used in a given context. In practice, any one of these types of metadata, any combination of these types of metadata, or one or more different types of metadata may be used.

The first model generator may have used one or more first techniques, such as a weighted variable analysis technique, a regression technique (e.g., a linear regression technique, a power function regression technique, a logarithmic regression technique, and/or the like), a random forest classification technique, a gradient boosting machine learning (GBM) technique, and/or the like, to train the first model to determine a score of a recommended content item (e.g., a probability that a user will be interested in the recommended content item, and/or the like). After generating the first model, the first model generator may provide the first model to the server device 105.

In FIG. 1A, assume further that a second model generator of the content delivery system generated a second model, different from the first model, to also provide recommendations based on the content items. The second model generator may have trained the second model based on one or more second types of metadata that are different than at least one of the one or more first types of metadata. For example, if the one or more first types of metadata include information identifying genre and creators, the one or more second types of metadata may include information identifying ratings and release year. As another example, if the one or more first types of metadata include information identifying genre, creators, and ratings, the one or more second types of metadata may include information identifying genre, creators, and release year.

Additionally, or alternatively, the second model generator may have used one or more second techniques, different than the one or more first techniques, to train the second model to determine a score of a recommended content item (e.g., a probability that a user will be interested in the recommended content item, and/or the like). For example, if the first model generator trained the first model using a weighted variable analysis technique, the second model generator may have trained the second model using a regression technique (e.g., a linear regression technique, a power function regression technique, a logarithmic regression technique, and/or the like), a random forest classification technique, a GBM technique, and/or the like. As another example, if the first model generator used a weighted variable analysis technique involving first weights (e.g., genre being weighted 50%, creators being weighted 40%, ratings being weighted 10%, and/or the like), the second model generator may have used a weighted variable analysis technique involving second weights that are different than the first weights (e.g., creators being weighted 30%, genre being weighted 30%, ratings being weighted 30%, release year being weighted 10%, and/or the like). After generating the second model, the second model generator may provide the second model to the server device 105.

In FIG. 1A, assume further that the server device 105 has obtained and stored content data associated with the content delivery system. The content data may include a plurality of content data sets associated with a plurality of content items. With respect to a content item, a content data set may include an identifier of the content item (e.g., a title of the content item, an image associated with the content item, and/or the like), metadata associated with the content item, and/or the like.

As shown by reference number 120 in FIG. 1A, the server device 105 may provide the content data, the first model, and the second model to the testing platform 110. The server device 105 may be configured to provide the content data, the first model, and the second model to the testing platform 110 based on receiving a request from the testing platform 110, based on a configuration of the server device 105, based on receiving an instruction from a user, and/or the like. In some implementations, the server device 105 may transmit, and the testing platform 110 may receive, a link to the content data, a link to the first model, and/or a link to the second model. The testing platform 110 may use the links to obtain the content data, the first model, and/or the second model from a storage device. Additionally, or alternatively, the server device 105 may transmit the content data, the first model, and/or the second model to the testing platform 110 without transmitting a link for the content data, the first model, and/or the second model. Upon receipt of the content data, the first model, and/or the second model, the testing platform 110 may store the content data, the first model, and/or the second model in one or more data structures for later access.

The testing platform 110 may be configured to evaluate the first model and the second model within a plurality of testing modes, such as a first testing mode, a second testing mode, and/or a third testing mode. In the first testing mode, which will be described in more detail below in connection with FIGS. 1C-1E, the testing platform 110 may obtain and store recommendations from the first model, which are arranged in a first order, and recommendations from the second model, which are arranged in a second order. The testing platform 110 may combine the recommendations to form a combination of recommendations (e.g., in a random order, an alphanumeric order, and/or the like). The testing platform 110 may present the combination of recommendations for display on a user interface. Users, via client devices (e.g., the client devices 115), may select recommendations from the combination of recommendations and arrange the selected recommendations in an order of interest to the users. The testing platform 110, upon receipt of the selected recommendations in the order of interest to the users, may compare the order of the selected recommendations with the first order of recommendations from the first model and the second order of recommendations from the second model. The testing platform 110 may determine that the recommendations more closely aligned with the selected recommendations are more accurate and thus indicative of a better model.

In the second testing mode, which will be described in more detail below in connection with FIGS. 1F-1H, the testing platform may present recommendations from the first model in one grouping for display on the user interface and present recommendations from the second model in another grouping for display on the user interface. Users, via client devices (e.g., the client devices 115), may select the one grouping or the other grouping, based on which grouping is more accurate to the users. The testing platform 110 may determine that the grouping more often selected by the users includes more accurate recommendations and is likewise indicative of a better model.

In the third testing mode, which will be described in more detail below in connection with FIGS. 1I-1K, the testing platform may present a single recommendation from the first model and a single recommendation from the second model for display on the user interface. Users, via client devices (e.g., the client devices 115), may select the single recommendation from the first model or the single recommendation from second model, based on which recommendation is more accurate to the users. The testing platform 110 may determine that the single recommendation more often selected by the users is a more accurate recommendation and is thus indicative of a better model.

The three testing modes are intended to be examples of a quantity of testing modes and types of testing modes that might be used in a given context. In practice, any one of these testing modes, any combination of these testing modes, or one or more different types of testing modes may be used.

Figure 1B:
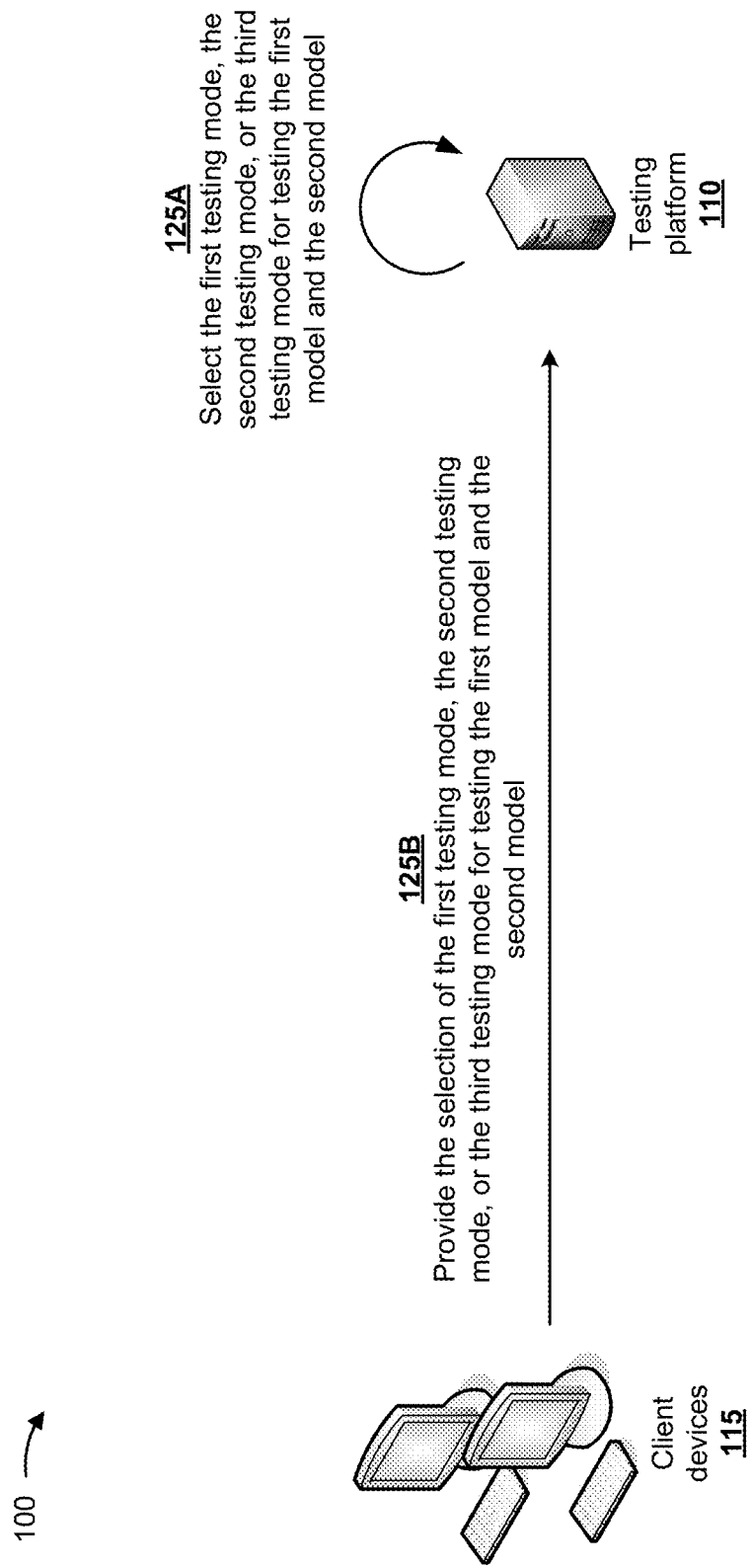

As shown by reference number 125A in FIG. 1B, the testing platform 110 may select the first testing mode, the second testing mode, or the third testing mode for testing the first model and the second model. In some implementations, the testing platform 110 may be configured to operate in the first testing mode, the second testing mode, the third testing mode, or a combination thereof. For example, the testing platform 110 may be configured to operate in a single testing mode (of the plurality of testing modes), to operate in multiple testing modes (e.g., any two or more of the plurality of testing modes), to operate in multiple testing modes in a particular order (e.g., operate in the first testing mode before the second testing mode, operate in the second testing mode before the third testing mode, and/or the like), and/or the like. In some implementations, an administrator of the testing platform 110 may input a command to the testing platform 110 to indicate, to the testing platform 110, in which testing mode(s) the testing platform 110 is to operate, and the testing platform 110 may select the testing mode(s) based on the command.

As shown by reference number 125B in FIG. 1B, the client devices 115 may provide, to the testing platform 110, a selection of the first testing mode, the second testing mode, or the third testing mode for testing the first model and the second model. In some implementations, the testing platform 110 may provide information identifying the first testing mode, the second testing mode, and/or the third testing mode as options to a plurality of client devices, including the client devices 115, via a user interface associated with the testing platform 110. For example, after users of the plurality of client devices access the user interface (e.g., based on an invitation to participate in a model evaluation process, and/or the like), the user interface may display information identifying the first testing mode, the second testing mode, and/or the third testing mode. The user interface may prompt the users to make a selection to begin evaluating different outputs of the first model and/or the second model. The client devices 115 may provide the selection at the same time, at different times, over a time period, and/or the like.

Figure 1C:
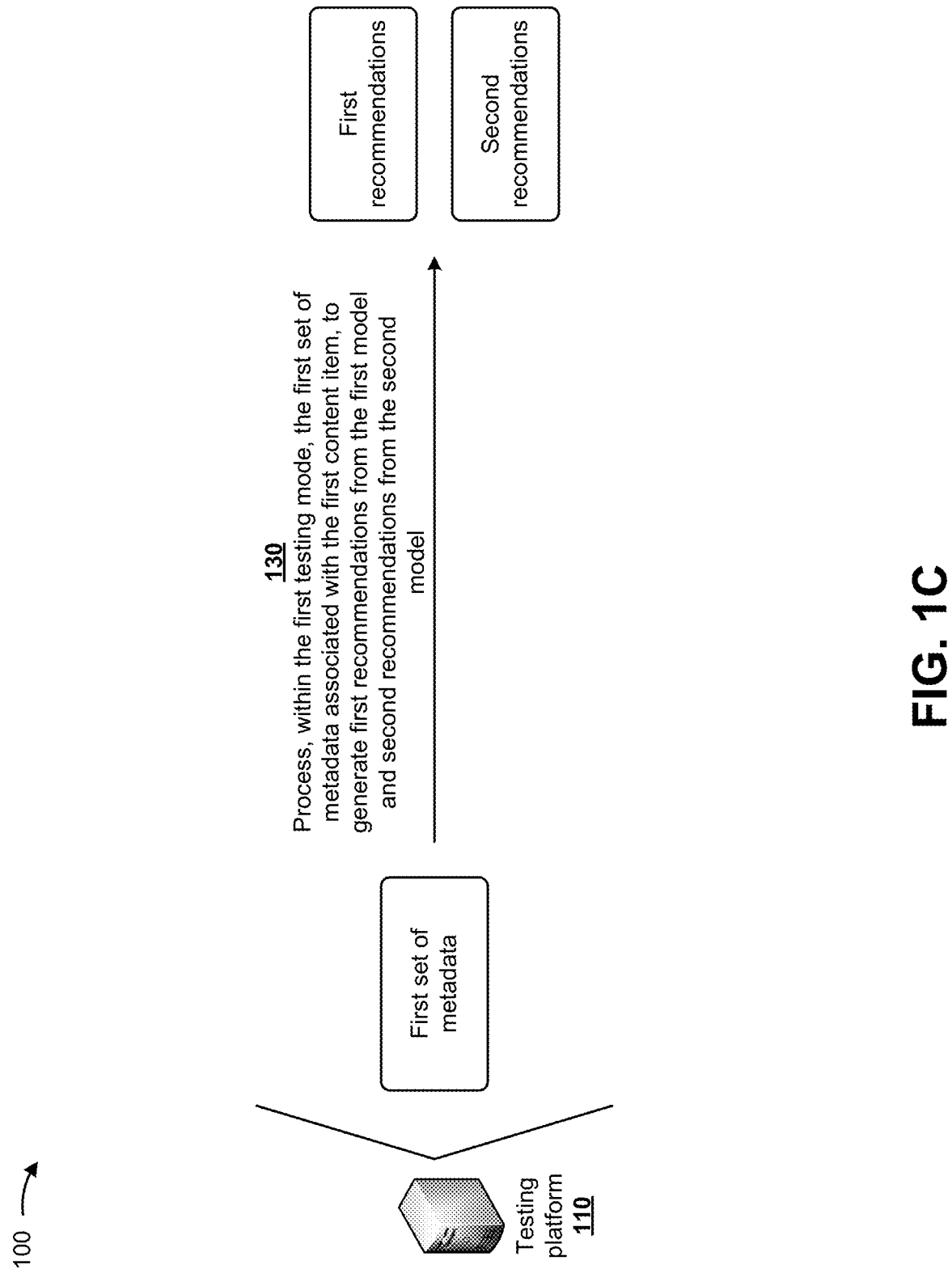

Assume, for the example shown in FIG. 1C, that the testing platform 110 or the client devices 115 provide the selection of the first testing mode. Upon selection of the first testing mode, the testing platform 110 may access the one or more data structures and select (e.g., randomly, based on a particular order, and/or the like) a first content data set from the content data. The first content data set may include a first identifier of a first content item, a first set of metadata associated with the first content item, and/or the like. If the first model and the second model have been trained based on different types of metadata (e.g., the first model having been trained based on the one or more first types of metadata, the second model having been trained based on the one or more second types of metadata, and/or the like), the first set of metadata may include a first subset of metadata for input into the first model and a second subset of metadata for input into the second model. In such a case, the first subset of metadata may include the one or more first types of metadata associated with the first content item, and the second subset of metadata may include the one or more second types of metadata associated with the first content item.

In some implementations, after selection of the first testing mode, the testing platform 110 may access the one or more data structures and select (e.g., randomly, based on a particular order, and/or the like) one or more content data sets from the content data. The one or more content data sets may include the first content data set, which includes the first identifier of the first content item and the first set of metadata. Based on the selection of the one or more content data sets, the testing platform 110 may provide one or more content identifiers, including the first identifier, to the client devices 115 for selection. For example, the testing platform 110 may display, on the user interface, the first identifier of the first content item. In case users are unfamiliar with the first content item or otherwise choose not to analyze recommendations based on the first content item, the user interface may include an option to request a different content item to analyze different recommendations. In another example, the testing platform 110 may display, on the user interface, a plurality of content identifiers, including the first identifier of the first content item. In this example, users may select any of the plurality of content identifiers to evaluate corresponding recommendations. For purposes of explanation, assume that the users associated with the client devices 115 selected the first identifier of the first content item for further assessment.

As shown by reference number 130 in FIG. 1C, the testing platform 110 may process, within the first testing mode, the first set of metadata associated with the first content item, to generate first recommendations from the first model and second recommendations from the second model. For example, if the testing platform 110 selected the first content data set, the testing platform 110 may input the first set of metadata associated with the first content item (or, respectively, the first subset of metadata and the second subset of metadata) into the first model and the second model. As another example, if the users associated with the client devices 115 selected the first identifier of the first content item, the testing platform 110, based on the selection, may search the one or more data structures for the first identifier to identify the first set of metadata. The testing platform 110 may input the first set of metadata associated with the first content item (or, respectively, the first subset of metadata and the second subset of metadata) into the first model and the second model. After the first model and the second model process the first set of metadata (or, respectively, the first subset of metadata and the second subset of metadata), the first model may generate the first recommendations, and the second model may generate the second recommendations.

For example, assume that the first content item is a first movie, such as "Men in Black." The testing platform 110 may input the first set of metadata or the first subset of metadata into the first model. Based on the first set of metadata or the first subset of metadata, the first model may determine scores of recommended content items of the content data. Based on the scores, the first model may output the first recommendations (e.g., content items having the highest scores, content items having scores that satisfy a threshold, and/or the like), and the testing platform 110 may arrange the first recommendations in a first order (e.g., from highest to lowest score, and/or the like). The first recommendations may include a first set of movies that are different than "Men in Black." For example, assume that the first recommendations, arranged in the first order, are (1) "Independence Day," (2) "Alien," and (3) "Guardians of the Galaxy."

The testing platform 110 may likewise input the first set of metadata or the second subset of metadata associated with "Men in Black" into the second model. Based on the first set of metadata or the second subset of metadata, the second model may determine scores of recommended content items of the content data. Based on the scores, the second model may output the second recommendations (e.g., content items having the highest scores, having scores that satisfy a threshold, and/or the like), and the testing platform 110 may arrange the second recommendations in a second order (e.g., from highest to lowest score, and/or the like). The second recommendations may include a second set of movies that are different than "Men in Black." For example, assume that the second recommendations, arranged in the second order, are (1) "Men in Black II," (2) "I am Legend," and (3) "Independence Day."

After the testing platform 110 respectively arranges the first recommendations in the first order and the second recommendations in the second order, the testing platform 110 may store the first recommendations in the first order and the second recommendations in the second order for later assessment. To avoid biasing user feedback (e.g., by providing users associated with the client devices 115 with the first order and the second order), the testing platform 110 may combine the first recommendations with the second recommendations to form a combination of the first recommendations and the second recommendations. The testing platform 110 may eliminate any duplicate instances of recommendations (e.g., "Independence Day") and arrange the first recommendations and the second recommendations in a random order, an alphanumeric order, and/or the like.

Figure 1D:
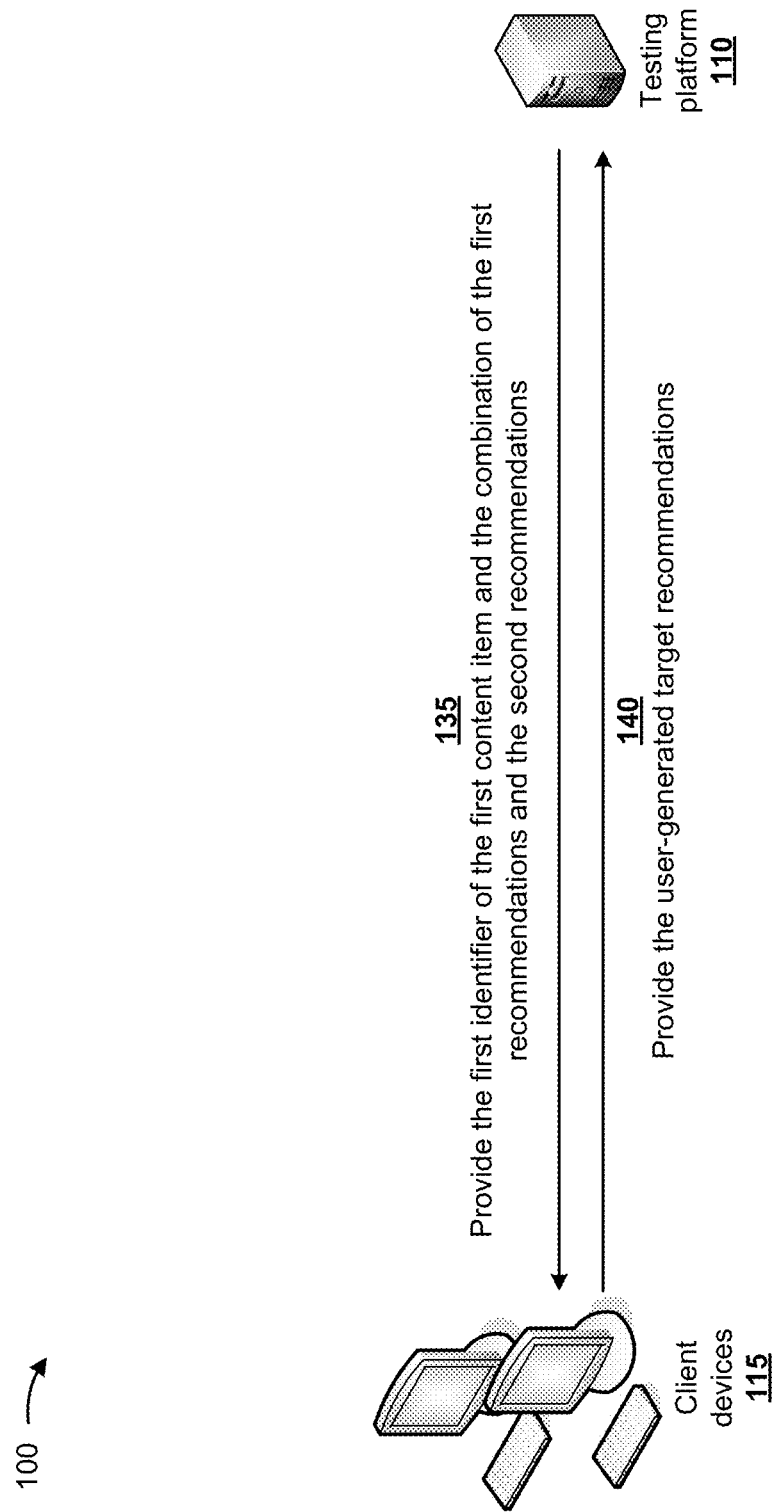

As shown by reference number 135 in FIG. 1D, the testing platform 110 may provide the first identifier of the first content item and the combination of the first recommendations and the second recommendations to the client devices 115. For example, the user interface may display information regarding the first movie, "Men in Black," along with "Independence Day," "Alien," "Guardians of the Galaxy," "Men in Black II," and "I am Legend" as proposed recommendations. The user interface may prompt the users associated with the client devices 115 to select movies from the proposed recommendations and arrange the movies in a desired order to define user-generated target recommendations. In response, for example, a user may select, in order of interest, (1) "Men in Black II," (2) "Independence Day," and (3) "I am Legend." Other users may select different movies, a different number of movies, arrange movies in different orders, and/or the like. Once the users determine the user-generated target recommendations, the users may submit the user-generated target recommendations via the client devices 115. Thus, as shown by reference number 140, the client devices 115 may provide the user-generated target recommendations to the testing platform 110.

Figure 1E:
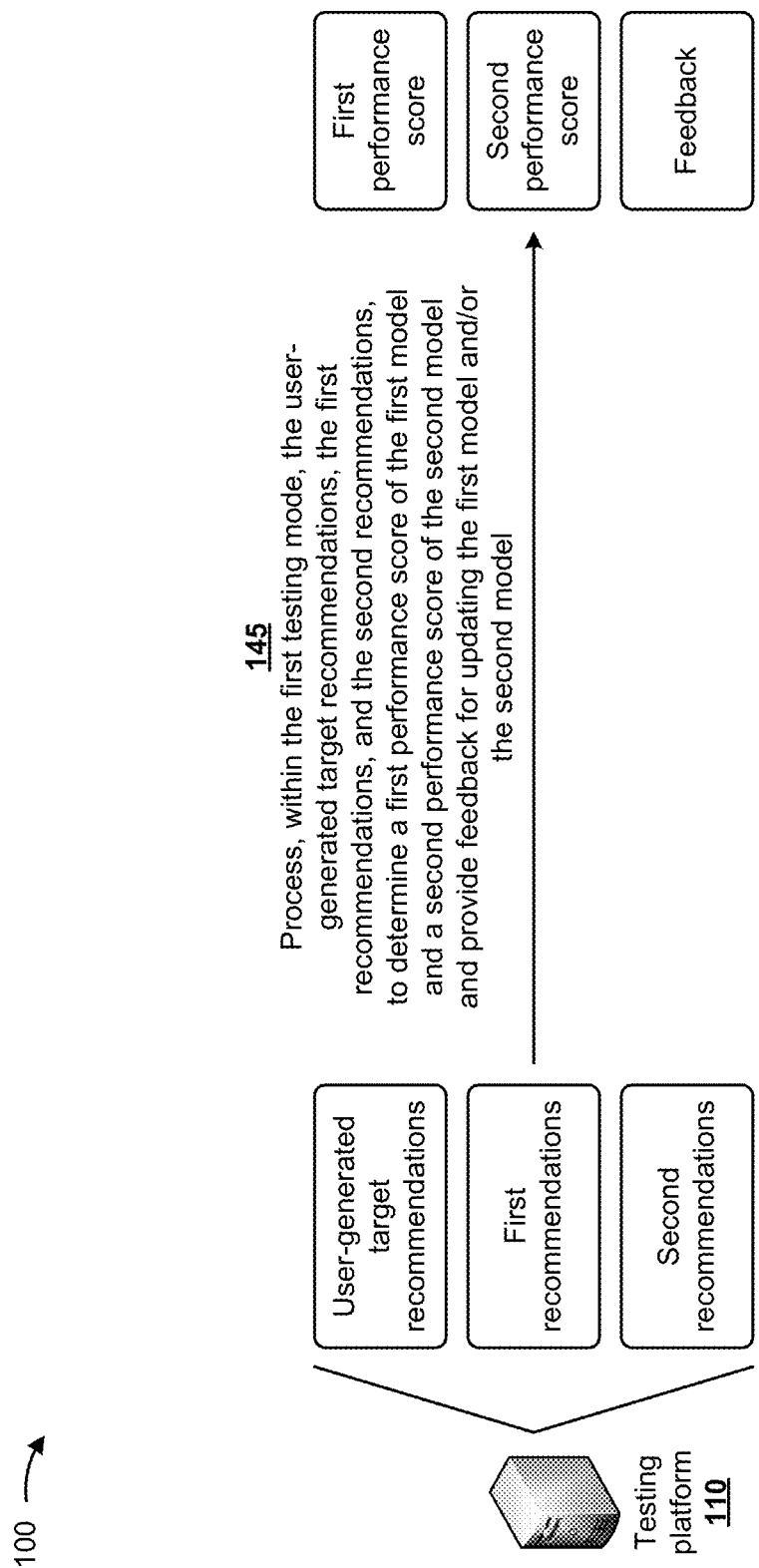

As shown by reference number 145 in FIG. 1E, the testing platform 110 may process, within the first testing mode, the user-generated target recommendations, the first recommendations, and the second recommendations, to determine a first performance score of the first model and a second performance score of the second model and provide feedback for updating the first model and/or the second model. To process the user-generated target recommendations, the first recommendations, and the second recommendations, the testing platform 110 may determine first distance metrics associated with the user-generated target recommendations and the first recommendations and second distance metrics associated with the user-generated target recommendations and the second recommendations. The first distance metrics may include first distances between respective positions of the user-generated target recommendations and respective positions of the first recommendations. For example, with respect to a recommendation of the user-generated target recommendations and/or the first recommendations, the testing platform 110 may calculate a first distance between a position of the recommendation in the user-generated target recommendations and a position of the recommendation in the first recommendations. The second distance metrics may include second distances between the respective positions of the user-generated target recommendations and respective positions of the second recommendations. For example, with respect to a recommendation of the user-generated target recommendations and/or the second recommendations, the testing platform 110 may calculate a second distance between a position of the recommendation in the user-generated target recommendations and a position of the recommendation in the second recommendations.

The testing platform 110 may calculate, based on the first distance metrics, a first score and/or a first weighted score for the first recommendations. To calculate the first score, the testing platform 110 may combine the first distances. In some implementations, the testing platform 110 may assign respective weights to the user-generated target recommendations (e.g., based on positions of the user-generated target recommendations). The testing platform 110 may multiply the respective weights by the respective first distances to define first weighted distances. To calculate the first weighted score for the first recommendations, the testing platform 110 may combine the first weighted distances.

Similarly, the testing platform 110 may calculate, based on the second distance metrics, a second score and/or a second weighted score for the second recommendations. To calculate the second score, the testing platform 110 may combine the second distances. In some implementations, after assigning the respective weights to the respective positions of the user-generated target recommendations, the testing platform 110 may multiply the respective weights by the respective second distances to define second weighted distances. To calculate the second weighted score for the second recommendations, the testing platform 110 may combine the second weighted distances.

For example, when comparing the user-generated target recommendations and the first recommendations, the testing platform 110 may determine that "Men in Black II" is in a first position in the user-generated target recommendations but is not provided in the first recommendations. To calculate a first distance of "Men in Black II" within the user-generated target recommendations with respect to the first recommendations, the testing platform 110 may operate based on an assumption that "Men in Black II" would have occupied a fourth position of the first recommendations. Thus, by subtracting 1 (e.g., of the first position of the user-recommended target recommendations) from 4 (e.g., of the fourth position of the first recommendations), the testing platform 110 may determine that the first distance of "Men in Black II" is 3. Looking at a second position in the user-generated target recommendations, "Independence Day" has a first distance of 1 because "Independence Day" is listed within a first position of the first recommendations. Applying this process to remaining movies within the user-generated target recommendations and/or the first recommendations, "I am Legend" has a first distance of 3 (e.g., based on the same rationale as "Men in Black II," as described above), "Alien" has a first distance of 2 (e.g., based on an assumption that "Alien" would have occupied a fourth position of the user-recommended target recommendations), and "Guardians of the Galaxy" has a first distance of 1 (e.g., based on an assumption that "Guardians of the Galaxy" would have occupied a fourth position of the user-generated target recommendations). By combining the first distances, the testing platform 110 may determine that the first score of the first recommendations is 10.

Similarly, in this example, when comparing the user-generated target recommendations and the second recommendations, the testing platform 110 may determine that "Men in Black II" has a second distance of 0, "Independence Day" has a second distance of 1, and "I am Legend" has a second distance of 1. As a result, the testing platform 110 may calculate that the second score of the second model is 2. Because the second score is less than the first score, the testing platform 110 may determine that the second recommendations of the second model were more closely aligned with the user-generated target recommendations of the user. Thus, the second recommendations, at least with respect to interests of the user, may have been more accurate than the first recommendations.

As another example, based on the first distances and the second distances, the testing platform 110 may calculate and compare the first weighted score and the second weighted score. To calculate the first weighted score and the second weighted score, the testing platform 110 may select and assign a first weight of 1 to "Men in Black II," which occupies the first position of the user-generated target recommendations, a second weight of 1.1 to "Independence Day," which occupies the second position, and a third weight of 1.2 to "I am Legend," which occupies the third position. Thus, the first weighted distances may be, respectively, 3, 1.1, and 3.6. Combining the first weighted distances, the testing platform 110 may calculate that the first weighted score is 7.6. Applying this process to calculate the second weighted score, the testing platform 110 may determine that the second weighted distances are, respectively, 0, 1.1, and 1.2. Combining the second weighted distances, the testing platform 110 may calculate that the second weighted score is 2.3. Because the second weighted score is less than the first weighted score, the testing platform 110 may determine that the second recommendations of the second model were more closely aligned with the user-generated target recommendations of the user and therefore more accurate than the first recommendations.

As the testing platform 110 obtains and processes user-generated recommendations from other users associated with the client devices 115, the testing platform 110 may combine and/or average, respectively, first scores, first weighted scores, second scores, and/or second weighted scores to define a first combined/average score, a first combined/average weighted score, a second combined/average score, a second combined/average weighted score, and/or the like. The testing platform 110 may determine the first performance score based on the first combined/average score and/or the first combined/average weighted score. Likewise, the testing platform 110 may determine the second performance score based on the second combined/average score and/or the second combined/average weighted score.

The testing platform 110 may store the first scores, the first weighted scores, the first combined/average score, the first combined/average weighted score, the first performance score, the second scores, the second weighted scores, the second combined/average score, the second combined/average weighted score, and/or the second performance score in a data structure to assess accuracy and/or performance of the first model and the second model. For example, based on the first performance score and/or the second performance score, the testing platform 110 may determine whether the first model and/or the second model should be implemented within a content delivery system, whether the first model and/or the second model should be modified and/or deleted, whether other models should be trained and/or evaluated, and/or the like. Based on the user-generated target recommendations, the testing platform 110 may generate feedback to provide to the first model generator and/or the second model generator for respectively updating the first model and/or the second model.

It should be understood that the process described in connection with FIGS. 1C-1E is provided merely as example. In practice, the process may be iterative and may involve users evaluating multiple content items and corresponding recommendations, different types of content items and corresponding recommendations, different methods of calculating the first score, the second score, the first weighted score, the second weighted score, the first combined/average score, the second combined/average score, the first combined/average weighted score, the second combined/average weighted score, the first performance score, and/or the second performance score, and/or the like.

Figure 1F:
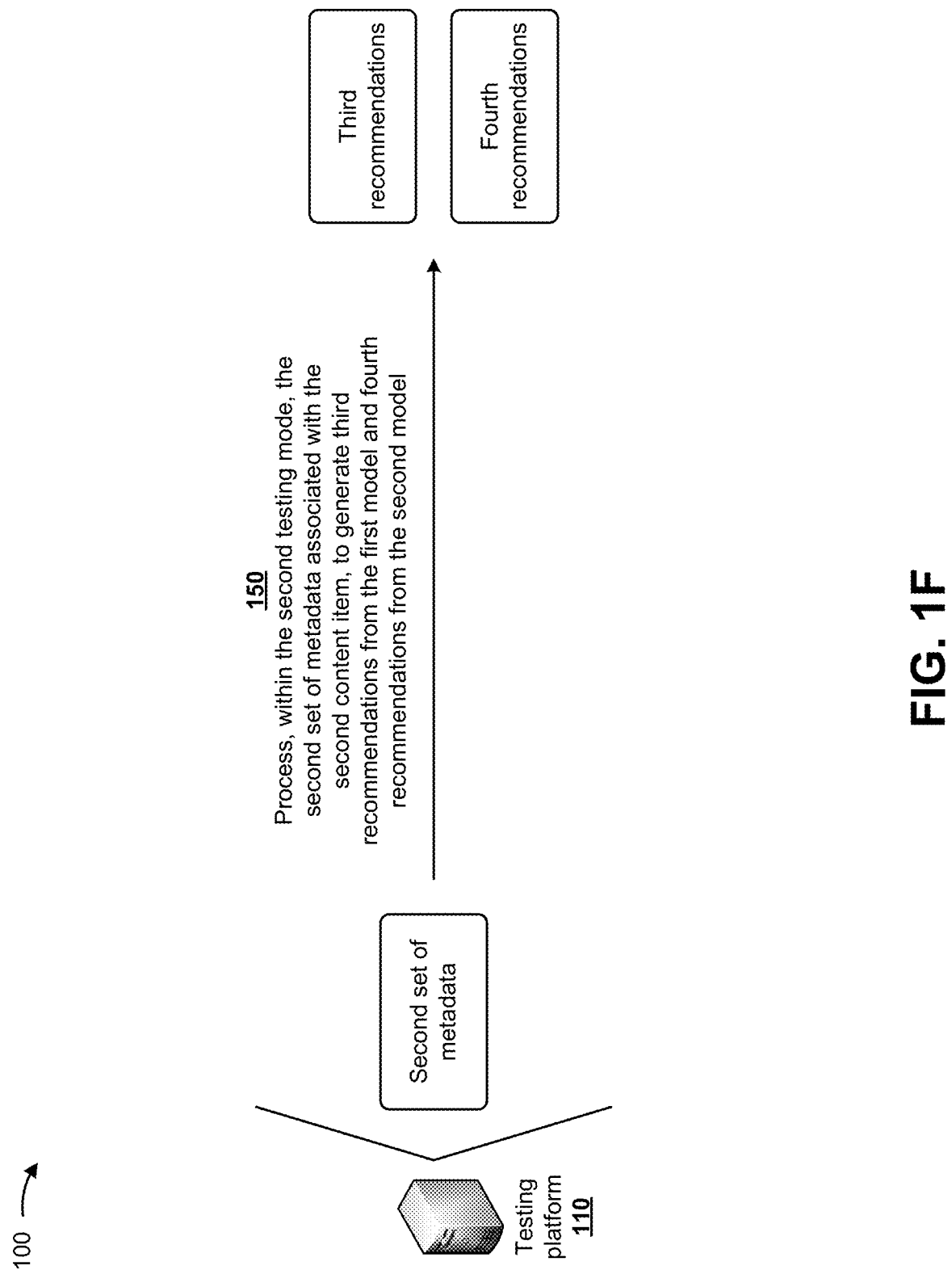

Turning to FIG. 1F, assume, for example, that the testing platform 110 or the client devices 115 provide the selection of the second testing mode after selecting the first testing mode. It should be understood, however, that the sequence of selecting the second testing mode after selecting the first testing mode is provided merely as an example. In practice, the testing platform 110 or the client devices 115 may provide the selection of the second testing mode instead of selecting the first testing mode, prior to selecting the first testing mode, and/or the like.

Upon selection of the second testing mode, the testing platform 110 may select (e.g., randomly, based on a particular order, and/or the like) a second content data set from the content data. The second content data set may include a second identifier of a second content item, a second set of metadata, and/or the like. If the first model and the second model have been trained based on different types of metadata, the second set of metadata may include a third subset of metadata for input into the first model and a fourth subset of metadata for input into the second model. It should be understood that the method of selecting the second testing mode and/or the second content data set is provided merely as an example. In practice, similar to that described above with respect to FIGS. 1C-1E, the testing platform 110 may select the second testing mode, the users associated with the client devices 115 may select the second identifier, and/or the like.

As shown by reference number 150 in FIG. 1F, the testing platform 110 may process, within the second testing mode, the second set of metadata associated with the second content item, to generate third recommendations from the first model and fourth recommendations from the second model. For example, the testing platform 110 may input the second set of metadata associated with the second content item (or, respectively, the third subset of metadata and the fourth subset of metadata) into the first model and the second model. After the first model and the second model process the second set of metadata associated with the second content item (or, respectively, the third subset of metadata and the fourth subset of metadata), the first model may generate the third recommendations, and the second model may generate the fourth recommendations.

For example, assume that the second content item is a second movie, such as "Pride and Prejudice." The testing platform 110, similar to that described above with respect to the first movie, may input the second set of metadata or the third subset of metadata into the first model. Based on the second set of metadata or the third subset of metadata, the first model may determine scores of recommended content items of the content data. Based on the scores, the first model may generate the third recommendations (e.g., "Emma," "Atonement," "Love Actually," and/or the like). In some implementations, the testing platform 110 may arrange the third recommendations in a third order (e.g., from highest to lowest score, and/or the like). For example, the third order of the third recommendations may be (1) "Emma," (2) "Atonement," and (3) "Love Actually." Based on input of the second set of metadata or the fourth subset of metadata, the second model may likewise determine scores of recommended content items and generate the fourth recommendations (e.g., "The Notebook," "Anna Karenina," "Emma," and/or the like). In some implementations, the testing platform 110 may arrange the fourth recommendations in a fourth order (e.g., from highest to lowest score, and/or the like). For example, the fourth order of the fourth recommendations may be (1) "The Notebook", (2) "Anna Karenina," and (3) "Emma." The testing platform 110 may store the third recommendations and the fourth recommendations for later assessment.

Figure 1G:
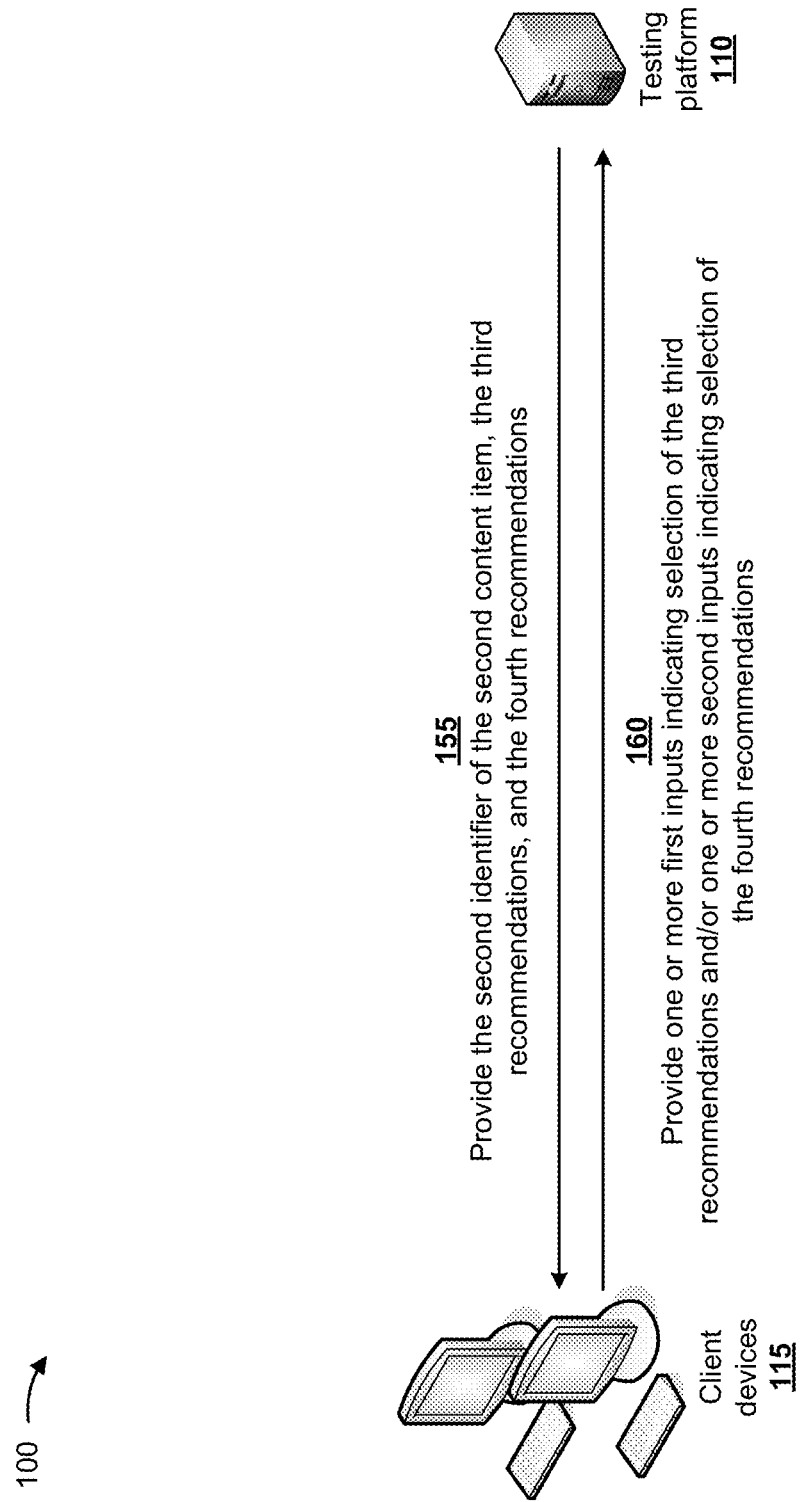

As shown by reference number 155 in FIG. 1G, the testing platform 110 may provide the second identifier of the second content item, the third recommendations, and the fourth recommendations to the client devices 115. For example, the user interface may display information regarding the second movie, "Pride and Prejudice," along with the third recommendations in a first grouping and the fourth recommendations in a second grouping. The user interface may prompt the users to select a grouping of the first grouping or the second grouping that the users determine to be more accurate as a whole. In response, the users may select the first grouping or the second grouping. Thus, as shown by reference number 160, the client devices 115 may provide one or more first inputs indicating selection of the third recommendations and/or one or more second inputs indicating selection of the fourth recommendations to the testing platform 110.

Figure 1H:
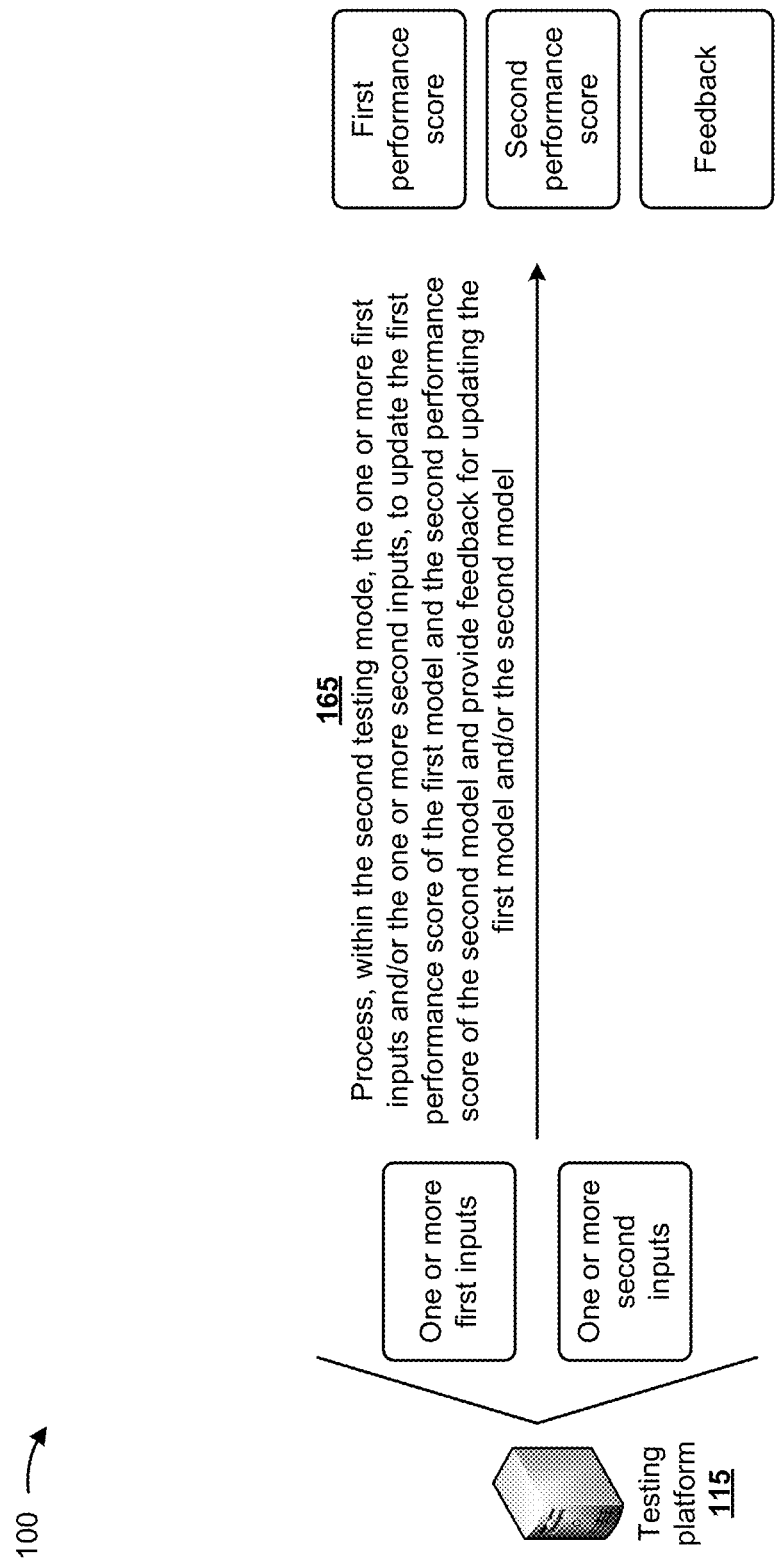

As shown by reference number 165 in FIG. 1H, the testing platform 110 may process, within the second testing mode, the one or more first inputs and/or the one or more second inputs, to update (or determine) the first performance score of the first model and the second performance score of the second model and provide feedback for updating the first model and/or the second model. To process the one or more first inputs and/or the one or more second inputs, the testing platform 110 may calculate a first conversion value for the first model based on a number of the one or more first inputs and calculate a second conversion value for the second model based on a number of the one or more second inputs. The first conversion value may be the number of the one or more first inputs divided by a total of the one or more first inputs and the one or more second inputs. The second conversion value may be the number of the one or more second inputs divided by the total of the one or more first inputs and the one or more second inputs.

For example, when processing the one or more first inputs and the one or more second inputs, the testing platform 110 may determine that the number of one or more first inputs is 40 and the number of one or more second inputs is 60. Thus, the testing platform 110 may calculate that the first conversion value is 40% (i.e., 40/(40+60)=0.4 or 40%) and the second conversion value is 60% (i.e., 60/(40+60)=0.6 or 60%). Because the second conversion value is greater than the first conversion value, the testing platform 110 may determine that an aggregate performance of the second model is better than an aggregate performance of the first model.

After the testing platform 110 obtains the one or more first inputs and/or the one or more second inputs and calculates the first conversion value and/or the second conversion value, the testing platform 110 may update the first performance score and/or the second performance score (e.g., by combining the first conversion value and the previously determined first performance score, by combining the second conversion value and the previously determined second performance score, and/or the like). In some implementations, for example if the users associated with the client devices 115 or the testing platform 110 selects the second testing mode instead of the first testing mode, the testing platform 110 may determine the first performance score and the second performance score based on the first conversion value and the second conversion value, respectively. Along with the values described above in association with the first testing mode, the testing platform 110 may store the number of the one or more first inputs, the first conversion value, the number of the one or more second inputs, and/or the second conversion value to assess accuracy and/or performance of the first model and the second model.

As described above with respect to the first testing mode, the testing platform 110 may determine, based on the first performance score and/or the second performance score, whether the first model and/or the second model should be implemented within a content delivery system, whether the first model and/or the second model should be modified and/or deleted, whether other models should be trained and/or evaluated, and/or the like. Based on content of the one or more second inputs and/or the one or more first inputs, respectively, the testing platform 110 may generate feedback to provide to the first model generator and/or the second model generator for respectively updating the first model and/or the second model.

It should be understood that the process described in connection with FIGS. 1F-1H is provided merely as example. In practice, the process may be iterative and may involve users evaluating multiple content items and corresponding recommendations, different types of content items and corresponding recommendations, different methods of calculating the first conversion value, the second conversion value, the first performance score, and/or the second performance score, and/or the like.

Figure 1I:
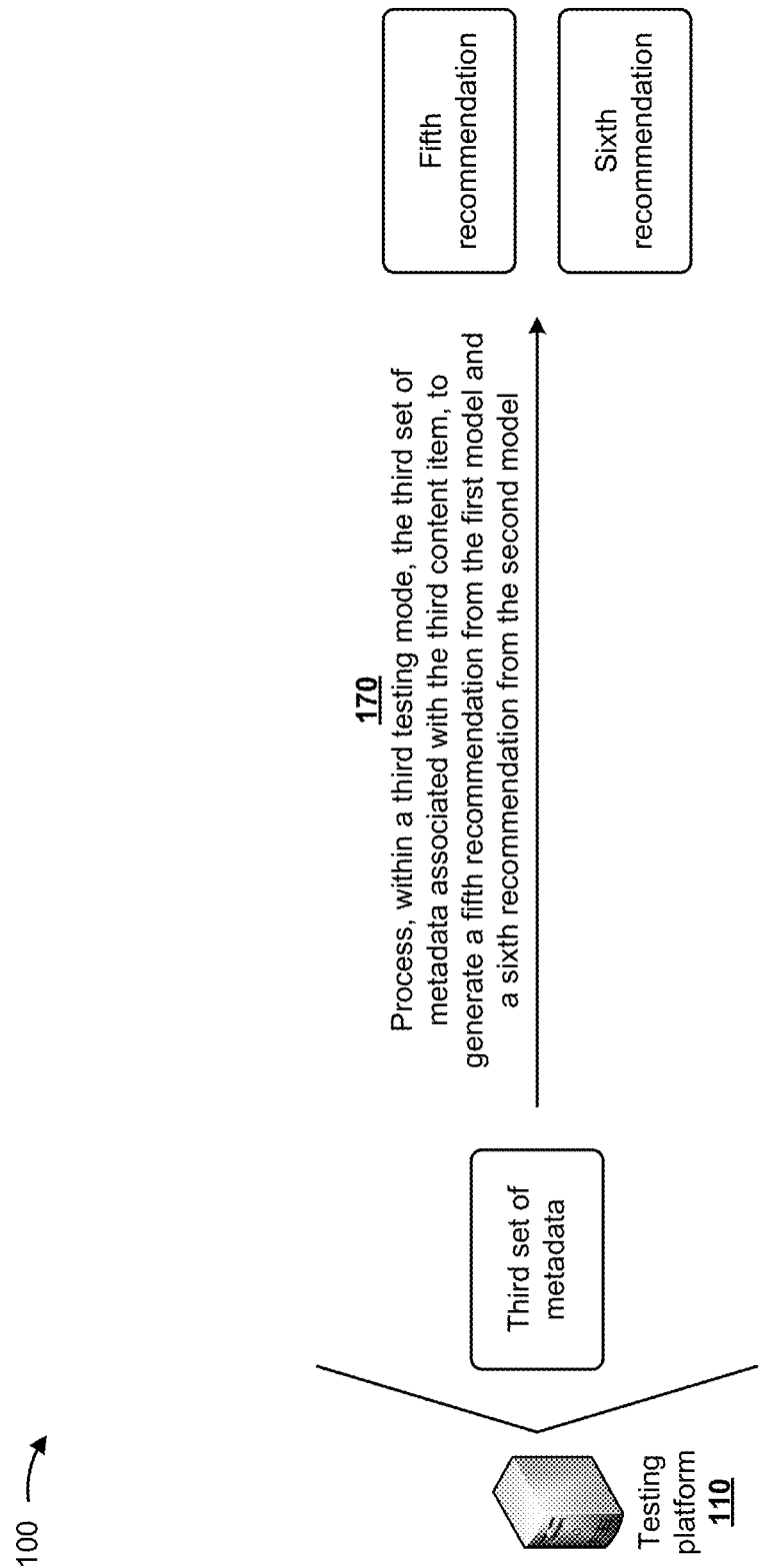

Turning to FIG. 1I, assume, for example, that the testing platform 110 or the client devices 115 provide the selection of the third testing mode after selecting the second testing mode. It should be understood, however, that the sequence of selecting the third testing mode after selecting the second testing mode is provided merely as an example. In practice, the testing platform 110 or the client devices 115 may provide the selection of the third testing mode instead of selecting the first testing mode and/or the second testing mode, prior to selecting the first testing mode and/or the second testing mode, and/or the like.

Upon selection of the third testing mode, the testing platform 110 may select (e.g., randomly, based on a particular order, and/or the like) a third content data set from the content data. The third content data set may include a third identifier of a third content item, a third set of metadata, and/or the like. If the first model and the second model have been trained based on different types of metadata, the third set of metadata may include a fifth subset of metadata for input into the first model and a sixth subset of metadata for input into the second model. It should be understood that the method of selecting the third testing mode and/or the second content data set is provided merely as an example. In practice, similar to that described above, the testing platform 110 may select the third testing mode, the users associated with the client devices 115 may select the third identifier, and/or the like.

As shown by reference number 170 in FIG. 1I, the testing platform 110 may process, within the third testing mode, the third set of metadata associated with the third content item, to generate a fifth recommendation from the first model and a sixth recommendation from the second model. For example, the testing platform 110 may input the third set of metadata associated with the third content item (or, alternatively, the fifth subset of metadata and the sixth subset of metadata) into the first model and the second model. After the first model and the second model process the third set of metadata associated with the third content item (or, respectively, the fifth subset of metadata and the sixth subset of metadata), the first model may generate the fifth recommendation, and the second model may generate the sixth recommendation.

For example, assume that the third content item is a third movie, such as "Ferris Bueller's Day Off." The testing platform 110, similar to that described above with respect to the first movie and/or the second movie, may input the third set of metadata or the fifth subset of metadata into the first model. Based on the third set of metadata or the fifth subset of metadata, the first model may determine scores of recommended content items of the content data. The testing platform 110 may select the fifth recommendation (e.g., "Breakfast Club" and/or the like) as the recommended content item with a highest score. Based on the third set of metadata or the sixth subset of metadata, the second model may likewise determine scores of recommended content items. The testing platform 110 may select the sixth recommendation (e.g., "Planes, Trains, and Automobiles" and/or the like) as the recommended content item with a highest score. The testing platform 110 may store the fifth recommendation and the sixth recommendation for later assessment.

Figure 1J:
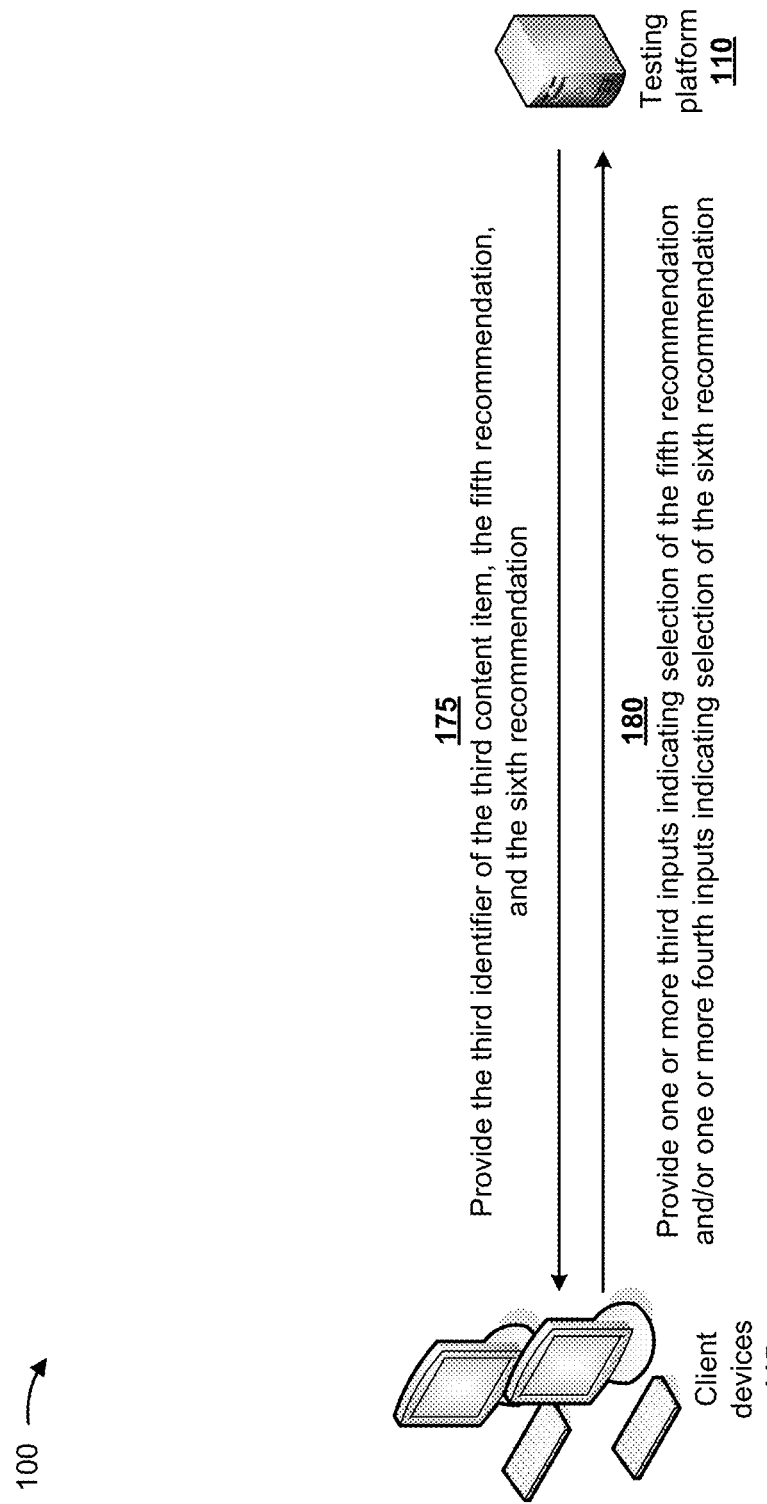

As shown by reference number 175 in FIG. 1J, the testing platform 110 may provide, via a user interface, the third identifier of the third content item, the fifth recommendation, and the sixth recommendation to the client devices 115. For example, the user interface may display information regarding the second movie, "Ferris Bueller's Day Off," along with the fifth recommendation, "Breakfast Club," and the sixth recommendation, "Planes, Trains, and Automobiles." The user interface may prompt the users associated with the client devices 115 to select a recommendation of the fifth recommendation or the sixth recommendation that the users determine to be more accurate. In response, the users may select the fifth recommendation or the sixth recommendation. Thus, as shown by reference number 180, the client devices 115 may provide one or more third inputs indicating selection of the fifth recommendation and/or one or more fourth inputs indicating selection of the sixth recommendation to the testing platform 110.

Figure 1K:
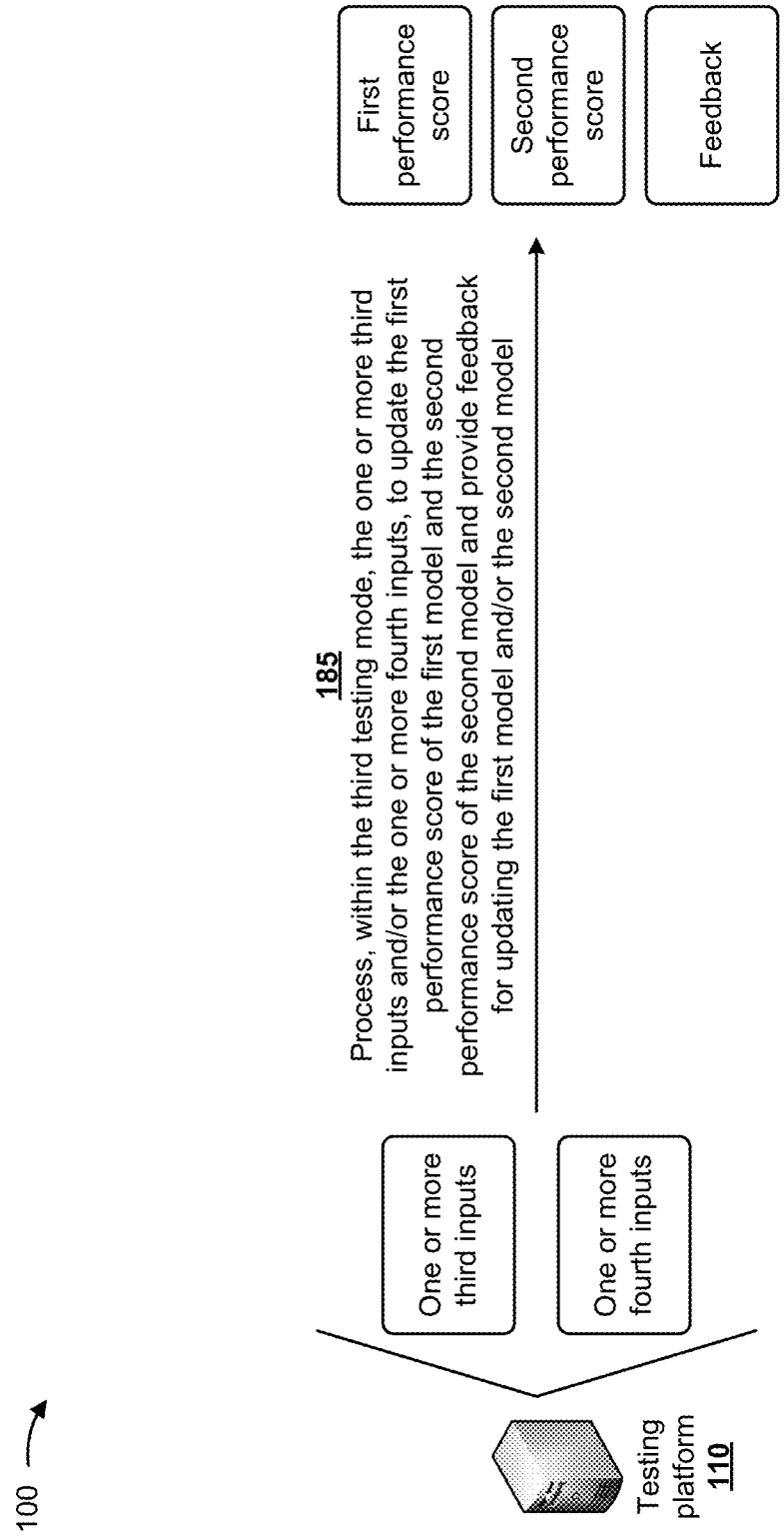

As shown by reference number 185 in FIG. 1K, the testing platform 110 may process, within the third testing mode, the one or more third inputs and/or the one more fourth inputs, to update (or determine) the first performance score of the first model and the second performance score of the second model and provide feedback for updating the first model and/or the second model. To process the one or more third inputs and/or the one or more fourth inputs, the testing platform 110 may calculate a third conversion value for the first model based on a number of the one or more third inputs and calculate a fourth conversion value for the second model based on a number of the one or more fourth inputs. The third conversion value may be the number of the one or more third inputs divided by a total of the one or more third inputs and the one or more fourth inputs. The fourth conversion value may be the number of the one or more fourth inputs divided by the total of the one or more third inputs and the one or more fourth inputs.

For example, when processing the one or more third inputs and the one or more fourth inputs, the testing platform 110 may determine that the number of one or more third inputs is 75 and the number of one or more fourth inputs is 25. Thus, the testing platform 110 may calculate that the third conversion value is 75% (i.e., 75/(75+25)=0.75 or 75%) and the fourth conversion value is 25% (i.e., 25/(75+25)=0.25 or 25%). Because the third conversion value is greater than the fourth conversion value, the testing platform 110 may determine that the fifth recommendation is more accurate than the sixth recommendation.

After the testing platform 110 obtains the one or more third inputs and/or the one or more fourth inputs and calculates the third conversion value and/or the fourth conversion value, the testing platform 110 may update the first performance score and/or the second performance score based on the third conversion value, the fourth conversion value, and/or the like. In some implementations, for example if the users associated with the client devices 115 or the testing platform 110 select the third testing mode instead of the first testing mode and the second testing mode, the testing platform 110 may determine the first performance score and the second performance score based on the third conversion value and the fourth conversion value, respectively. Along with the values described above in association with the first testing mode and the second testing mode, the testing platform 110 may store the number of the one or more third inputs, the third conversion value, the number of the one or more fourth inputs, and/or the fourth conversion value to assess accuracy and/or performance of the first model and the second model.

As described above with respect to the first testing mode and the second testing mode, the testing platform 110 may determine, based on the first performance score and/or the second performance score, whether the first model and/or the second model should be implemented within a content delivery system, whether the first model and/or the second model should be modified and/or deleted, whether other models should be trained and/or evaluated, and/or the like. Based on content of the one or more fourth inputs and/or the one or more third inputs, respectively, the testing platform 110 may generate feedback to provide to the first model generator and/or the second model generator for respectively updating the first model and/or the second model.

It should be understood that the process described in connection with FIGS. 1I-1K is provided merely as example. In practice, the process may be iterative and may involve users evaluating multiple content items and corresponding recommendations, different types of content items and corresponding recommendations, different methods of calculating the third conversion value, the fourth conversion value, the first performance score, and/or the second performance score, and/or the like.

Figure 1L:
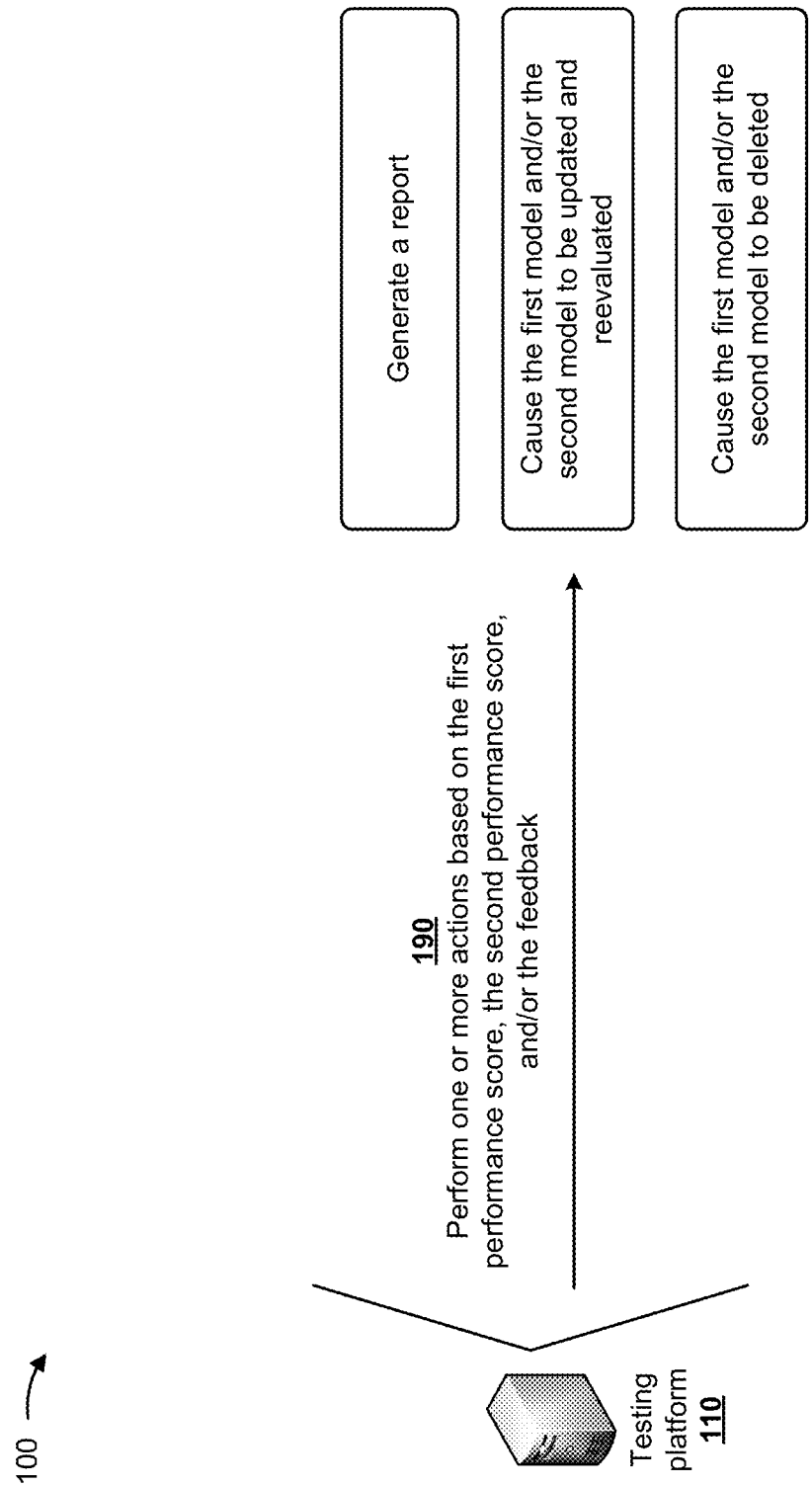
Figure 1M:
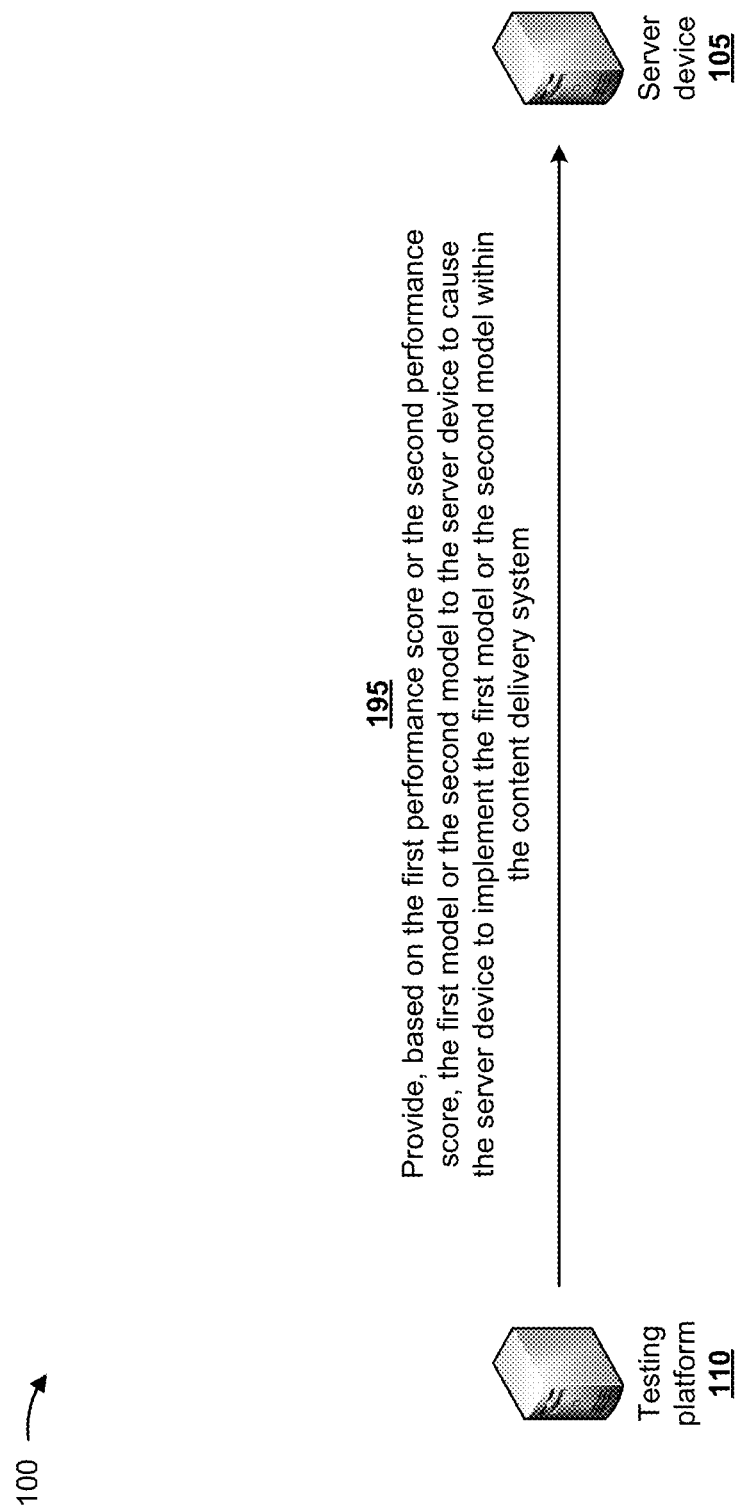

As shown by reference number 190 in FIG. 1L, the testing platform 110 may perform one or more actions based on the first performance score, the second performance score, and/or the feedback. The one or more actions may include generating a report, causing the first model and/or the second model to be updated and reevaluated, causing the first model and/or the second model to be deleted, and/or the like. For example, based on the first performance score and/or the second performance score, the testing platform 110 may generate a report to summarize results of the model evaluation process. The report may indicate the content items processed by the first model and/or the second model, recommendations made by the first model and/or the second model, the first combined/average score, the first combined/average weighted score, the second combined/average score, the second combined/average weighted score, the number of one or more first inputs, the first conversion value, the number of one or more second inputs, the second conversion value, the number of one or more third inputs, the third conversion value, the number of one or more fourth inputs, the fourth conversion value, first performance score, the second performance score, and/or the like. The testing platform 110 may present the report for display on a user interface, transmit the report via email, and/or the like.

Additionally, or alternatively, the testing platform 110 may cause the first model and/or the second model to be updated, based on the first performance score, the second performance score, and/or the feedback. For example, the testing platform 110 may provide the feedback to the first model generator to update the first model (e.g., based on the user-generated content recommendations, content of the one or more second inputs, content of the one or more fourth inputs, and/or the like). After the first model generator updates the first model and provides the first model to the testing platform 110, the testing platform 110 may reevaluate the first model (e.g., within the first testing mode, the second testing mode, the third testing mode, and/or the like). Likewise, the testing platform 110 may provide the feedback to the second model generator to update the second model (e.g., based on the user-generated target recommendations, content of the one or more first inputs, content of the one or more third inputs, and/or the like). After the second model generator updates the second model and provides the second model to the testing platform 110, the testing platform 110 may reevaluate the second model (e.g., within the first testing mode, the second testing mode, the third testing mode, and/or the like). Thus, the testing platform 110 may determine, via the model evaluation process, which models have potential and cause those models to be improved and reevaluated.

Additionally, or alternatively, the testing platform 110 may cause the first model and/or the second model to be deleted, based on the first performance score and/or the second performance score. For example, based on the first performance score failing to satisfy a performance threshold after a set number of iterations of evaluation, failing to improve by a threshold percentage, and/or the like, the testing platform 110 may instruct the first model generator to delete the first model. Likewise, based on the second performance score failing to satisfy a performance threshold after a set number of iterations, failing to improve by a threshold percentage, the testing platform 110 may instruct the second model generator to delete the second model. Thus, the testing platform 110 may determine, via the model evaluation process, which models lack potential and cause those models to be deleted.

Over time, the testing platform 110 may determine that one of the first performance score, the second performance score, and/or another performance score of another model separates above remaining performance scores of the first performance score, the second performance score, and/or the other performance score. For example, after the set number of iterations of evaluation, after a set period of time, and/or the like, the testing platform 110 may determine that the first performance score or the second performance score is a higher performance score by some amount than the other performance scores and is thus indicative of the best model. As a result, as shown by reference number 195 in FIG. 1M, the testing platform 110 may provide, based on the first performance score or the second performance score, the first model or the second model to the server device 105 to cause the server device 105 to implement the first model or the second model within the content delivery system.

Because the testing platform 110 enables models to be evaluated relative to a plurality of content data sets, over a plurality of client devices, and in a plurality of testing modes, the testing platform 110 may facilitate data analysis and, as a result, improve the models. By utilizing an iterative process of evaluation, the testing platform 110 may identify the best model for implementation within the content delivery system. Furthermore, the testing platform 110 may conserve computing resources and/or network resources that might otherwise have been consumed storing large amounts of data relating to content selection, analyzing the large amounts of data, and/or the like.

As indicated above, FIGS. 1A-1M are provided as an example. Other examples may differ from what is described with regard to FIGS. 1A-1M. The number and arrangement of devices shown in FIGS. 1A-1M are provided as an example. In practice, there may be additional devices, fewer devices, different devices, or differently arranged devices than those shown in FIGS. 1A-1M. Furthermore, two or more devices shown in FIGS. 1A-1M may be implemented within a single device, or a single device shown in FIGS. 1A-1M may be implemented as multiple, distributed devices. Additionally, or alternatively, a set of devices (e.g., one or more devices) shown in FIGS. 1A-1M may perform one or more functions described as being performed by another set of devices shown in FIGS. 1A-1M.

Figure 2:
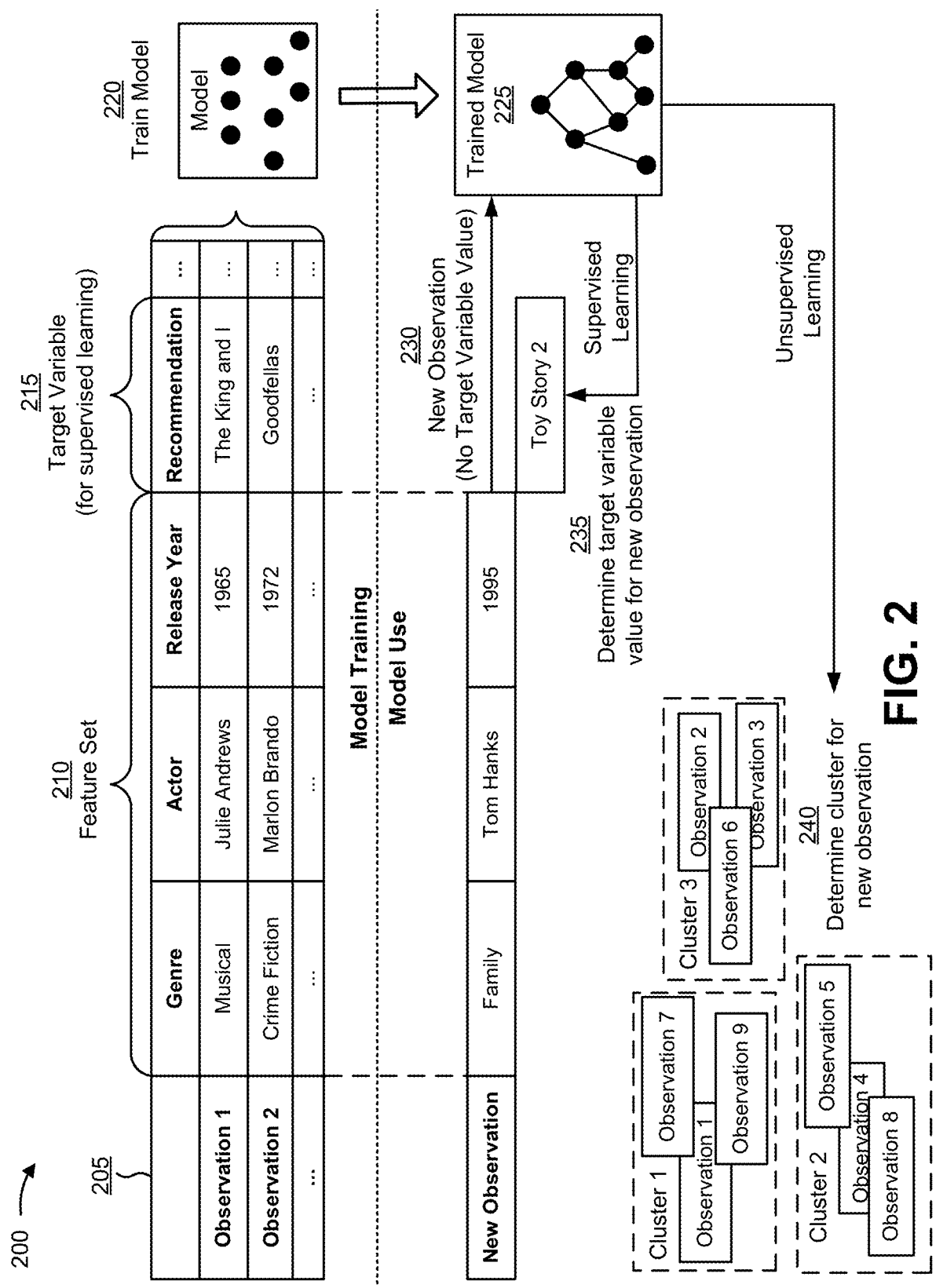
FIG. 2 is a diagram illustrating an example of training and using a model to generate recommendations

FIG. 2 is a diagram illustrating an example 200 of training and using a model (e.g., the first model, the second model, and/or the like) to generate recommendations. The model training and usage described herein may be performed using a machine learning system. The machine learning system may include or may be included in a computing device, a server, a cloud computing environment, and/or the like, such as the first model generator, the second model generator, and/or the testing platform 110, which are described in more detail elsewhere herein.

As shown by reference number 205, a model may be trained using a set of observations. The set of observations may be obtained from historical data, such as data gathered during one or more processes described herein. The historical data may include historical data relating to content items (e.g., one or more types of metadata of the content items, and/or the like), historical data relating to selections made based on the content items (e.g., selection history of the content items relative to other content items, and/or the like), historical data relating to user feedback (e.g., user feedback reflective of user interests, and/or the like). In some implementations, the machine learning system may receive the set of observations (e.g., as input) from a server device (e.g., server device 105) and/or client devices (e.g., the client devices 115), as described elsewhere herein.

As shown by reference number 210, the set of observations includes a feature set (e.g., a set of metadata, and/or the like). The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from client devices. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of "Genre," a second feature of "Actor," a third feature of "Release Year," and so on. As shown, for a first observation (e.g., a content item, such as the movie "Sound of Music"), the first feature may be "Musical," the second feature may be "Julie Andrews," the third feature may be "1965," and so on. These features and feature values are provided as examples, and may differ in other examples. For example, the feature set may include, with respect to an observation, one or more of the following features: a rating, an award, a director, an artist, a creator, an author, a publisher, a movie studio, a television network, a record label, a type, a language, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is "Recommendation," which may be "The King and I" for the first observation.

The feature set and target variable described above are provided as examples, and other examples may differ from what is described above. For example, for a target variable of "Goodfellas," the feature set may include "Crime Fiction," "Marlon Brando," "1972," and/or the like.

The target variable may represent a value that a model is being trained to predict, and the feature set may represent the variables that are input to a trained model to predict a value for the target variable. The set of observations may include target variable values so that the model can be trained to recognize patterns in the feature set that lead to a target variable value. A model that is trained to predict a target variable value may be referred to as a supervised learning model.

In some implementations, the model may be trained on a set of observations that do not include a target variable. This may be referred to as an unsupervised learning model. In this case, the model may learn patterns from the set of observations without labeling or supervision, and may provide output that indicates such patterns, such as by using clustering and/or association to identify related groups of items within the set of observations.

As shown by reference number 220, the machine learning system may train a model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the model as a trained model 225 to be used to analyze new observations.

As shown by reference number 230, the machine learning system may apply the trained model 225 to a new observation, such as by receiving a new observation and inputting the new observation to the trained model 225. As shown, the new observation may include a first feature of "Family," a second feature of "Tom Hanks," a third feature of "1995," and so on, as an example. The machine learning system may apply the trained model 225 to the new observation to generate an output (e.g., a result). The type of output may depend on the type of model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained model 225 may predict a recommendation of "Toy Story 2" for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained model 225 may classify (e.g., cluster) the new observation in a cluster, as shown by reference number 240. The observations within a cluster may have a threshold degree of similarity. As an example, if the machine learning system classifies the new observation in a first cluster, then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to generate content recommendations based on a content item. The machine learning system enables recognition and/or identification of tens, hundreds, thousands, or millions of features and/or feature values for tens, hundreds, thousands, or millions of observations, thereby increasing accuracy and consistency and reducing delay associated with generating recommendations relative to requiring computing resources to be allocated for tens, hundreds, or thousands of operators to manually generate recommendations using the features or feature values.

As indicated above, FIG. 2 is provided as an example. Other examples may differ from what is described in connection with FIG. 2. The feature set and target variables are provided as example. In practice, there may be additional features, fewer features, or different features than those shown in FIG. 2.

Figure 3:
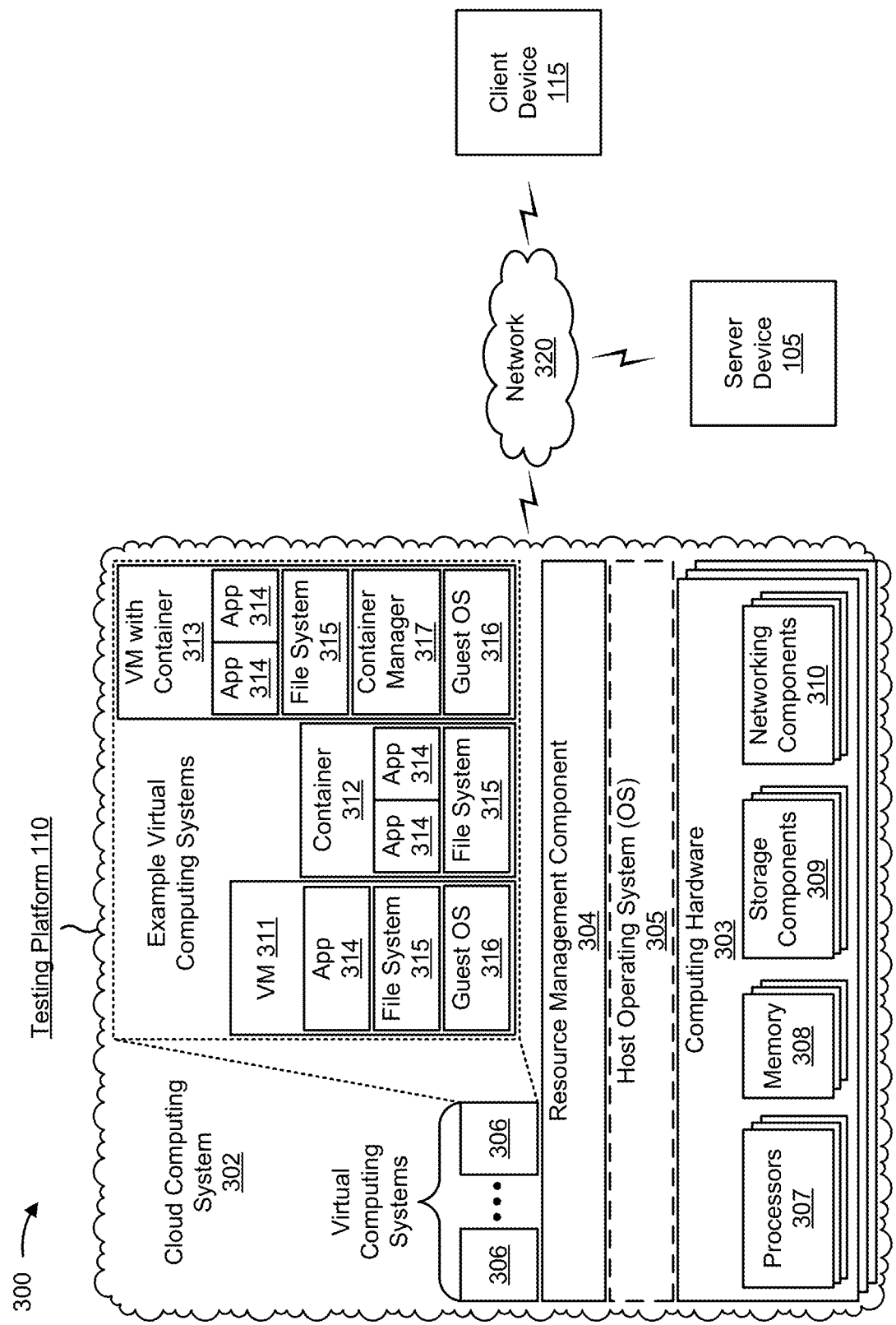
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a server device 105, a testing platform 110, a client device 115 (e.g., of the client devices 115), and/or a network 320. Devices of environment 300 may interconnect via wired connections, wireless connections, or a combination of wired and wireless connections.

The server device 105 includes one or more devices capable of receiving, generating, storing, processing, and/or providing information, such as information described herein. For example, the server device 105 may include a laptop computer, a tablet computer, a desktop computer, a group of server devices, or a similar device. The server device 105 may receive information from and/or transmit information to the testing platform 110.

The testing platform 110 includes one or more devices capable of receiving, generating, storing, processing, and/or providing information associated with evaluating models that generate recommendations. The testing platform 110 may include one or more elements of a cloud computing system 302 and/or may execute within the cloud computing system 302 (e.g., as one or more virtual computing systems 306). The cloud computing system 302 may include one or more elements 303-317, as described in more detail below.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using such virtualization, the resource management component 304 enables a single computing device (e.g., a computer, a server, a host device, and/or the like) to operate as if the single computing device were multiple computing devices, such as by creating multiple isolated virtual computing systems 306 from computing hardware 303 of the single computing device. The multiple virtual computing systems 306 operate independently from one another and do not interact with one another. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server or host device) or from multiple computing devices (e.g., multiple servers or host devices), such as multiple computing devices in one or more data centers, server farms, server pools, and/or the like. As shown, computing hardware 303 may include one or more processors 307, one or more memories 308, one or more storage components 309, and/or one or more networking components 310. Computing hardware 303 may be interconnected via one or more wired and/or wireless buses, which may interconnect computing hardware 303 within a single computing device and/or across multiple computing devices.

A processor 307 includes a central processing unit, a graphics processing unit, and/or the like. A memory 308 includes random access memory, read-only memory, and/or the like. The memory 308 may store a set of instructions (e.g., one or more instructions) for execution by the processor 307. The processor 307 may execute the set of instructions to perform one or more operations or processes described herein. In some implementations, execution of the set of instructions, by one or more processors 307, causes the one or more processors 307 and/or the testing platform 110 to perform one or more operations or processes described herein. A storage component 309 includes a hard disk or another type of storage device that stores information, data, and/or software (e.g., code, instructions, and/or the like) related to the operation and use of the testing platform 110. In some implementations, memory 308 and/or storage component 309 is/are implemented as a non-transitory computer readable medium. A networking component 310 includes a network interface and corresponding hardware that enables the testing platform 110 to communicate with other devices of environment 300 via a wired connection and/or a wireless connection, such as via network 320. Additional examples of a processor, a memory, a storage component, and a networking component (e.g., a communication interface) are described elsewhere herein.

The resource management component 304 includes a virtualization application (e.g., executing on hardware, such as computing hardware 303) capable of virtualizing computing hardware 303 to start (e.g., create or spin up), stop (e.g., delete or tear down), and/or manage one or more virtual computing systems 306. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 304 may control access to and/or use of computing hardware 303 and/or software executing on computing hardware 303. Additionally, or alternatively, the resource management component 304 may perform binary rewriting to scan instructions received from a virtual computing system 306 and replace any privileged instructions with safe emulations of those instructions. The resource management component 304 may include a hypervisor or a virtual machine monitor, such as when the virtual computing systems 306 are virtual machines 311. Additionally, or alternatively, the resource management component 304 may include a container manager, such as when the virtual computing systems 306 are containers 312.

In some implementations, the resource management component 304 executes within and/or in coordination with a host operating system 305. For example, the resource management component 304 may execute on top of the host operating system 305 rather than interacting directly with computing hardware 303, such as when the resource management component 304 is a hosted hypervisor (e.g., a Type 2 hypervisor) or a container manager. In this case, the host operating system 305 may control access to and/or use of computing hardware 303 and/or software executing on computing hardware 303 based on information and/or instructions received from the resource management component 304. Alternatively, the resource management component 304 may interact directly with computing hardware 303 rather than interacting with the host operating system 305, such as when the resource management component 304 is a bare-metal hypervisor (e.g., a Type 1 hypervisor). Thus, in some implementations, the cloud computing system 302 does not include a host operating system 305. In some implementations, the host operating system 305 includes and/or executes an administrator application to enable a system administrator to manage, customize, and/or configure cloud computing system 302.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications 314 using a file system 315. The file system 315 may include binary files, software libraries, and/or other resources required to execute applications 314 on a guest operating system 316 or the host operating system 305. In some implementations, a virtual computing system 306 (e.g., a virtual machine 311 or a hybrid environment 313) includes a guest operating system 316. In some implementations, a virtual computing system 306 (e.g., a container 312 or a hybrid environment 313) includes a container manager 317.

A virtual machine 311 is an emulation of a computing device that enables execution of separate, isolated instances of virtual computing devices (e.g., multiple virtual machines 311) on the same computing hardware 303. The guest operating systems 316 and applications 314 of multiple virtual machines 311 may share computing hardware 303 from a single computing device or from multiple computing devices (e.g., a pool of computing devices). Each separate virtual machine 311 may include a guest operating system 316, a file system 315, and one or more applications 314. With a virtual machine 311, the underlying computing hardware 303 is virtualized, and the guest operating system 316 executes on top of this virtualized hardware. Using virtual machines 311 enables different types of guest operating systems 316 to execute on the same computing hardware 303 in an isolated environment, but with more resource usage and overhead than containers 312.

Unlike a virtual machine 311, a container 312 virtualizes a host operating system 305 rather than the underlying computing hardware 303. Thus, a container 312 does not require a guest operating system 316 because the application(s) 314 included in the container 312 execute directly on the host operating system 305 using a file system 315 included in the container 312. Each separate container 312 may share the kernel of the host operating system 305, and different applications 314 within a single container 312 may share a file system 315. This sharing of a file system 315 among multiple applications 314 reduces the need to reproduce operating system code for different applications, and enables a single host operating system 305 to execute multiple applications 314 and/or containers 312. As a result, containers 312 enable a greater quantity of applications 314 to execute on a smaller quantity of computing devices as compared to virtual machines 311.

A hybrid environment 313 includes elements of a virtual machine 311 and a container 312. For example, a hybrid environment 313 may include a guest operating system 316 that executes on top of virtualized hardware. A container manager 317 may execute on top of the guest operating system 316 to start, stop, and/or manage one or more containers within the hybrid environment 313. Using a hybrid environment 313 enables different types of guest operating systems 316 to execute on the same computing hardware 303 in an isolated environment, while also enabling lightweight containers to execute on top of the guest operating system 316.

The quantity of applications 314 shown in FIG. 3 as executing within each virtual computing system 306 is shown as an example, and a different quantity of applications 314 may execute within each virtual computing system. Furthermore, although the testing platform 110 may include one or more elements 303-317 of the cloud computing system 302, may execute within the cloud computing system 302, and/or may be hosted within the cloud computing system 302, in some implementations, the testing platform 110 may not be cloud-based (e.g., may be implemented outside of a cloud computing system) or may be partially cloud-based. For example, the testing platform 110 may include one or more devices that are not part of the cloud computing system 302. The testing platform 110 may perform one or more operations and/or processes described in more detail elsewhere herein.

The client device 115 includes one or more devices capable of receiving, generating, storing, processing, and/or providing information, such as information described herein. For example, the client device 115 may include a computing device (e.g., a desktop computer, a laptop computer, a tablet computer, a handheld computer, a server, etc.), a mobile phone (e.g., a smart phone, a radiotelephone, etc.), or a similar device. In some implementations, the client device 115 may receive information from and/or transmit information to the testing platform 110.

Network 320 includes one or more wired and/or wireless networks. For example, network 320 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
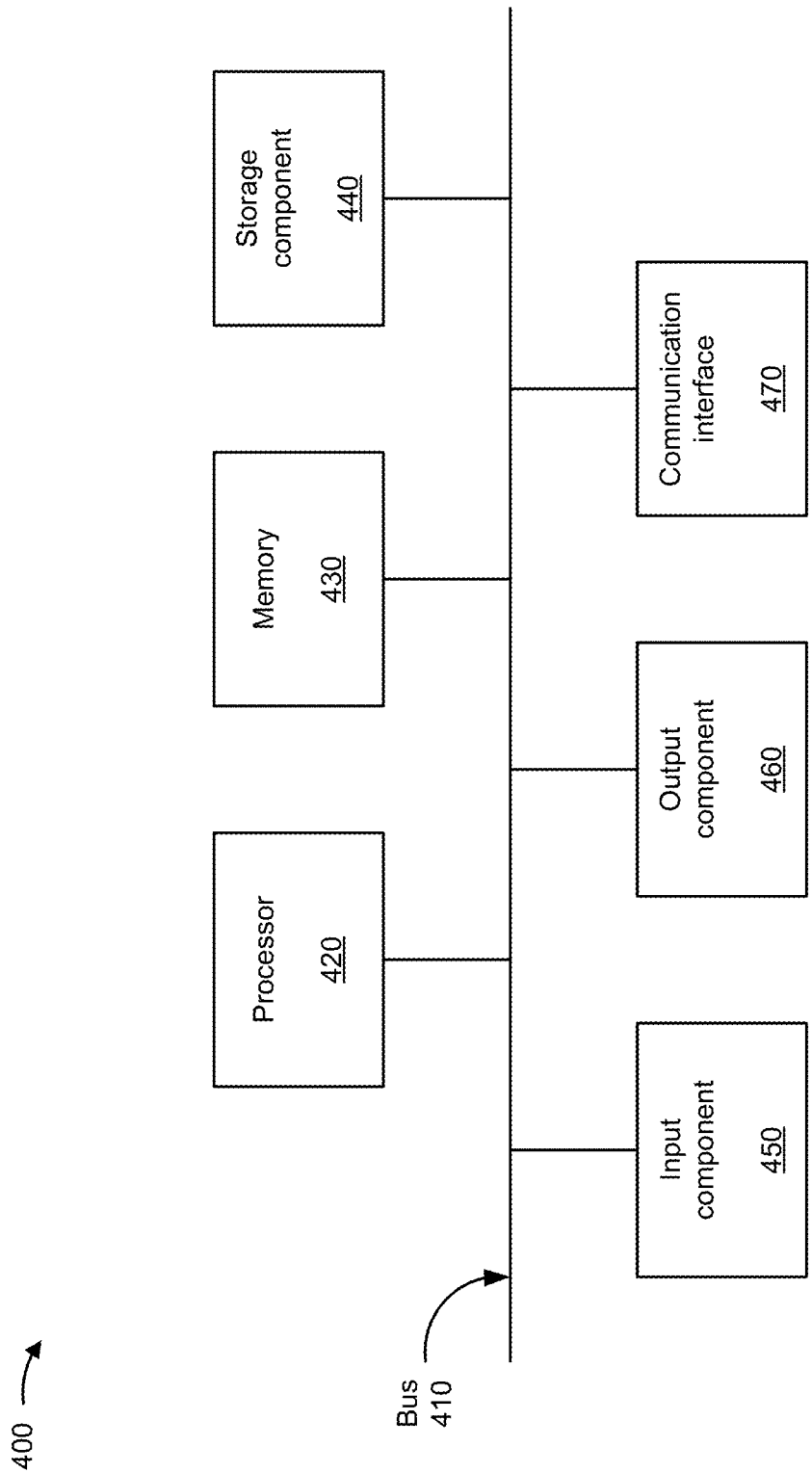
FIG. 4 is a diagram of example components of one or more devices of FIG. 3.

FIG. 4 is a diagram of example components of a device 400. Device 400 may correspond to the server device 105, the testing platform 110, and/or the client device 115. In some implementations, the server device 105, the testing platform 110, and/or the client device 115 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
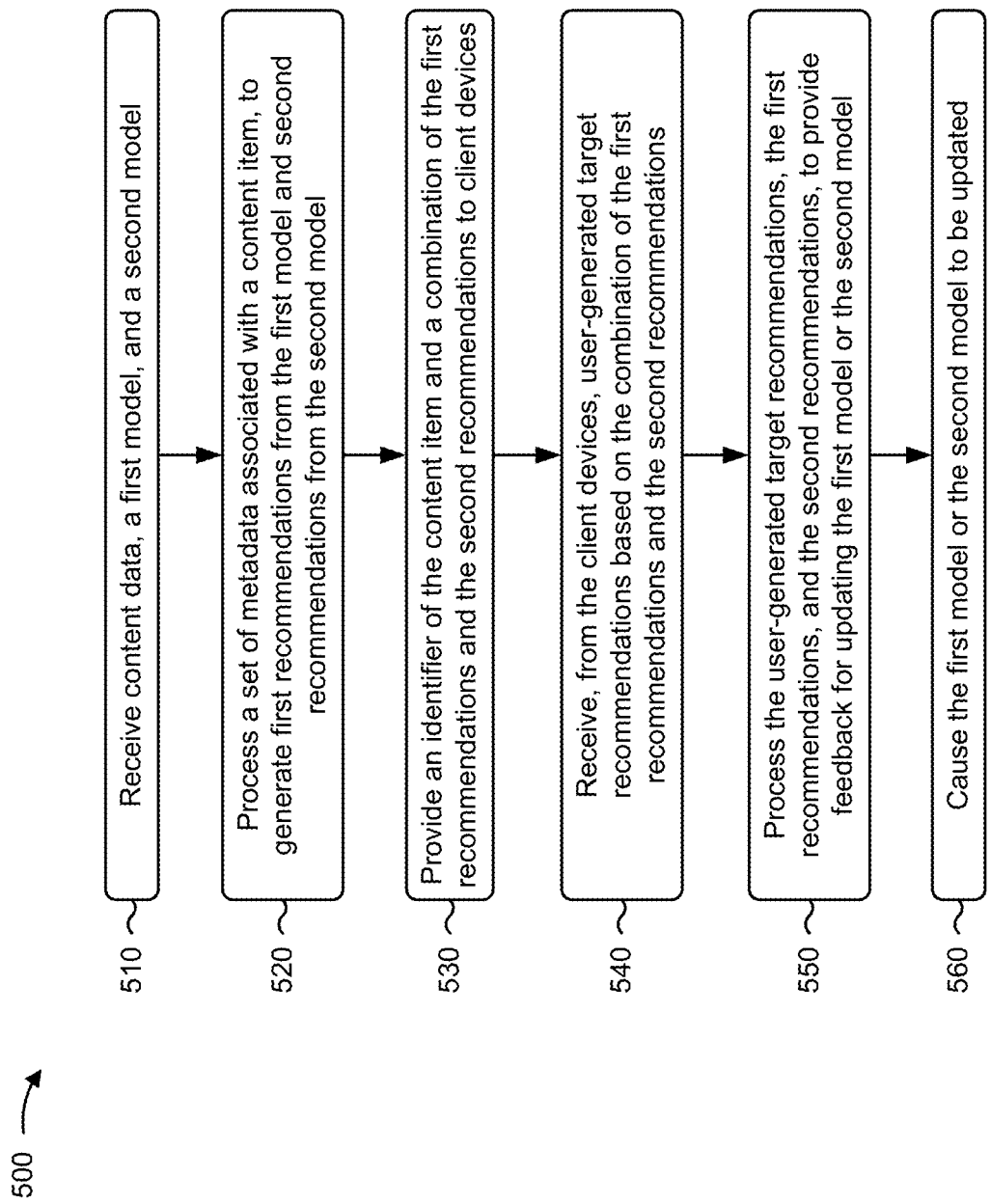
FIG. 5 is a flow chart of an example process relating to evaluating models that generate recommendations.

FIG. 5 is a flow chart of an example process 500 associated with evaluating models that generate recommendations. In some implementations, one or more process blocks of FIG. 5 may be performed by a device (e.g., testing platform 110). In some implementations, one or more process blocks of FIG. 5 may be performed by another device or a group of devices separate from or including the device, such as server device (e.g., server device 105), client devices (e.g., client devices 115), and/or the like. Additionally, or alternatively, one or more process blocks of FIG. 5 may be performed by one or more components of device 400, such as processor 420, memory 430, storage component 440, input component 450, output component 460, communication interface 470, and/or the like.

As shown in FIG. 5, process 500 may include receiving content data, a first model, and a second model (block 510). For example, the device may receive content data, a first model, and a second model, as described above. The content data may include a first identifier of a first content item, a first set of metadata associated with the first content item, a second identifier of a second content item, a second set of metadata associated with the second content item, a third identifier of a third content item, and/or a third set of metadata associated with the third content item. The first model may be trained on different types of data than the second model. In some implementations, the first model may be trained using a different technique than the second model.

As further shown in FIG. 5, process 500 may include processing a set of metadata associated with a content item, to generate first recommendations from the first model and second recommendations from the second model (block 520). For example, the device may process a first set of metadata associated with a content item, to generate first recommendations from the first model and second recommendations from the second model, as described above. The set of metadata associated with the content item may include the first set of metadata associated with the first content item. Processing the set of metadata associated with the content item may occur within a first testing mode.

As further shown in FIG. 5, process 500 may include providing an identifier of the content item and a combination of the first recommendations and the second recommendations to client devices (block 530). For example, the device may provide an identifier of the content item and a combination of the first recommendations and the second recommendations to client devices, as described above. The identifier of the content item may include the first identifier of the first content item.

As further shown in FIG. 5, process 500 may include receiving, from the client devices, user-generated target recommendations based on the combination of the first recommendations and the second recommendations (block 540). For example, the device may receive, from the client devices, user-generated target recommendations based on the combination of the first recommendations and the second recommendations, as described above. The user-generated target recommendations may include at least one of the first recommendations or the second recommendations.

As further shown in FIG. 5, process 500 may include processing the user-generated target recommendations, the first recommendations, and the second recommendations, to provide feedback for updating the first model or the second model (block 550). For example, the device may process the user-generated target recommendations, the first recommendations, and the second recommendations, to provide feedback for updating the first model or the second model, as described above. Processing the user-generated target recommendations, the first recommendations, and the second recommendations may occur within the first testing mode and may be to determine a first performance score of the first model and a second performance score of the second model. Processing the user-generated target recommendations, the first recommendations, and the second recommendations may comprise determining first distance metrics associated with the user-generated target recommendations and the first recommendations; determining second distance metrics associated with the user-generated target recommendations and the second recommendations; calculating first scores for the first recommendations based on the first distance metrics; calculating second scores for the second recommendations based on the second distance metrics; calculating the first performance score of the first model based on the first scores to determine whether to cause the first model to be updated; and calculating the second performance score of the second model based on the second scores to determine whether to cause the second model to be updated. In some implementations, processing the user-generated target recommendations, the first recommendations, and the second recommendations may comprise determining first distance metrics associated with the user-generated target recommendations and the first recommendations; determining second distance metrics associated with the user-generated target recommendations and the second recommendations; calculating first weighted scores for the first recommendations based on the first distance metrics; calculating second weighted scores for the second recommendations based on the second distance metrics; calculating the first performance score based on the first weighted scores to determine whether to cause the first model to be updated; and calculating the second performance score based on the second weighted scores to determine whether to cause the second model to be updated. In some implementations, process 500 may include generating, based on the user-generated target recommendations, the feedback for updating the first model and the second model.

As further shown in FIG. 5, process 500 may include causing the first model or the second model to be updated (block 560). For example, the device may cause the first model or the second model to be updated, as described above. In some implementations, process 500 may include causing the first model and/or the second model to be updated or implemented in the content delivery system based on the feedback, the first performance score of the first model, and/or the second performance score of the second model. Causing the first model and/or the second model to be updated or implemented in the content delivery system may include causing the first model and/or the second model to be updated based on the feedback, the first performance score of the first model, and/or the second performance score of the second model.

Process 500 may further include processing, within a second testing mode, the second set of metadata associated with the second content item, to generate third recommendations from the first model and fourth recommendations from the second model; providing the second identifier of the second content item, the third recommendations, and the fourth recommendations to the client devices; receiving, from the client devices, one or more first inputs indicating selection of the third recommendations and/or one or more second inputs indicating selection of the fourth recommendations; processing, within the second testing mode, the one or more first inputs and/or the one or more second inputs, to update the first performance score of the first model and the second performance score of the second model. Processing the one or more first inputs and/or the one or more second inputs may be to provide additional feedback to update the first model and the second model. Processing the one or more first inputs and/or the one or more second inputs may comprise calculating a first conversion value for the first model based on a number of the one or more first inputs; calculating a second conversion value for the second model based on a number of the one or more second inputs; calculating or updating the first performance score of the first model based on the first conversion value; and calculating or updating the second performance score of the second model based on the second conversion value.

Process 500 may further include processing, within a third testing mode, the third identifier of the third content item, to generate a fifth recommendation from the first model and a sixth recommendation from the second model; provide the third identifier of the third content item, the fifth recommendation, and the sixth recommendation to the client devices; receive, from the client devices, one or more third inputs indicating selection of the fifth recommendation and/or one or more fourth inputs indicating selection of the sixth recommendation; process, within the third testing mode, the one or more third inputs and/or the one or more fourth inputs, to update the first performance score and the second performance score. Processing the one or more third inputs and/or the one or more fourth inputs may comprise calculating a first conversion value for the first model based on a number of the one or more third inputs; calculating a second conversion value for the second model based on a number of the one or more fourth inputs; updating the first performance score of the first model based on the first conversion value; and updating the second performance score of the second model based on the second conversion value.

Process 500 may further include performing one or more actions based on the first performance score of the first model or the second performance score of the second model. In some implementations, process 500 may further include performing one or more additional actions based on the first performance score of the second performance score. The one or more actions may include causing the first model or the second model to be updated; causing the first model or the second model to be deleted; generating a report; or reevaluating the first model or the second model. In some implementations, the one or more actions may include generating the report based on the first performance score of the first model and the second performance score of the second model; and providing the report for display. The one or more additional actions may include a different one of causing the first model or the second model to be updated; causing the first model or the second model to be deleted; generating the report; or reevaluating the first model or the second model.

In some implementations, process 500 may include causing the first model or the second model to be deleted based on the first performance score or the second performance score; generating a report relating to the first performance score of the first model, the second performance score of the second model, and/or the feedback for updating the first model and the second model; or reevaluating the first model or the second model after the first model or the second model have been updated based on the feedback, the first performance score of the first model, and/or the second performance score of the second model. Process 500 may include generating a report based on the first performance score and the second performance score and providing the report for display. Process 500 may include reevaluating the first model and the second model to update the first performance score of the first model and the second performance score of the second model; and causing the first model or the second model to be implemented within the content delivery system based on the first performance score of the first model and the second performance score of the second model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   processing, by a device and within a testing mode, metadata associated with content data to generate recommendations from one or more models;

receiving, by the device, user-generated target recommendations based on the recommendations;

processing, by the device, the user-generated target recommendations and the recommendations to determine a performance score associated with a model, of the one or more models, and provide feedback for updating the model; and causing, by the device, the model to be updated based on the feedback and the performance score.

2. The method of claim 1, further comprising:
calculating a conversion value for the model based on a number of inputs; and
updating the performance score based on the conversion value.

3. The method of claim 1, wherein the model is a first model, and
wherein the one or more models include:
the first model trained based on a first type of metadata associated with the content data, and
a second model trained based on a second type of metadata associated with the content data,
wherein the first type of metadata is different than the second type of metadata; and
wherein processing the metadata associated with the content data to generate the recommendations comprises:
processing the metadata to generate the recommendations based on the first type of metadata and the second type of metadata.

4. The method of claim 1, wherein processing the user-generated target recommendations and the recommendations comprises:
determining distance metrics associated with the user-generated target recommendations and a set of recommendations, of the recommendations, from the model;
calculating weighted scores for the set of recommendations based on the distance metrics; and
calculating the performance score based on the weighted scores to determine whether to cause the model to be updated.

5. The method of claim 1, wherein the user-generated target recommendations include at least one of the recommendations.

6. The method of claim 1, further comprising:
generating a report relating to the performance score of the model.

7. The method of claim 1, further comprising:
reevaluating the model after the model has been updated based on the feedback and the performance score associated with the model.

8. A device, comprising:
one or more processors configured to:
generate first recommendations from a first model and second recommendations from a second model based on content data,
wherein the first model is different than the second model;
receive user-generated target recommendations based on a combination of the first recommendations and the second recommendations;
process the user-generated target recommendations, the first recommendations, and the second recommendations, to determine a first performance score of the first model or a second performance score of the second model; and
perform one or more actions based on the first performance score or the second performance score.

9. The device of claim 8, wherein the first model is trained on different types of metadata than the second model.

10. The device of claim 8, wherein the one or more actions include one of:
causing the first model or the second model to be updated;
causing the first model or the second model to be deleted;
generating a report; or
reevaluating the first model or the second model.

11. The device of claim 8, wherein the one or more processors are further configured to:
calculate a first conversion value for the first model based on a number of inputs; and
update the first performance score of the first model based on the first conversion value.

12. The device of claim 8, wherein the one or more processors, when processing the user-generated target recommendations, the first recommendations, and the second recommendations, are configured to:
calculate first scores for the first recommendations based on first distance metrics;
calculate second scores for the second recommendations based on second distance metrics;
calculate the first performance score of the first model based on the first scores; and
calculate the second performance score of the second model based on the second scores.

13. The device of claim 8, wherein the one or more actions include:
generating a report based on the first performance score of the first model and the second performance score of the second model; and
providing the report for display.

14. The device of claim 8, wherein the user-generated target recommendations include at least one of the first recommendations.

15. A non-transitory computer-readable medium storing instructions, the instructions comprising:
one or more instructions that, when executed by one or more processors, cause the one or more processors to:
process, within a testing mode, metadata associated with content data to generate recommendations from a model;
receive user-generated target recommendations based on the recommendations;
process the user-generated target recommendations and the recommendations to determine a performance score associated with the model, and provide feedback for updating the model; and
cause the model to be updated based on the feedback and the performance score.

16. The non-transitory computer-readable medium of claim 15, wherein the one or more instructions further cause the one or more processors to:
calculate a conversion value for the model based on a number of inputs; and
update the performance score based on the conversion value.

17. The non-transitory computer-readable medium of claim 15, wherein the one or more instructions, when processing the user-generated target recommendations and the recommendations, cause the one or more processors to:
determine distance metrics associated with the user-generated target recommendations and the recommendations;
calculate weighted scores for the recommendations based on the distance metrics; and calculate the performance score for the model based on the weighted scores to determine whether to cause the model to be updated.

18. The non-transitory computer-readable medium of claim 15, wherein the one or more instructions further cause the one or more processors to:
generate a report relating to the performance score of the model.

19. The non-transitory computer-readable medium of claim 15, wherein the one or more instructions further cause the one or more processors to:
reevaluate the model after the model has been updated based on the feedback and the performance score.

20. The non-transitory computer-readable medium of claim 15, wherein the user-generated target recommendations include at least one of the recommendations.

* * * * *